(12) United States Patent
Ohwa

(10) Patent No.: US 8,041,154 B2
(45) Date of Patent: Oct. 18, 2011

(54) INFORMATION PROCESSING APPARATUS, METHOD AND PROGRAM

(75) Inventor: Tsunayuki Ohwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1051 days.

(21) Appl. No.: 11/901,592

(22) Filed: Sep. 18, 2007

(65) Prior Publication Data

US 2008/0089593 A1 Apr. 17, 2008

(30) Foreign Application Priority Data

Sep. 19, 2006 (JP) ................. 2006-252238

(51) Int. Cl.
*G06K 9/54* (2006.01)
*G06K 9/60* (2006.01)
(52) U.S. Cl. ......... 382/305; 382/226; 707/821; 358/403
(58) Field of Classification Search .......... 382/225–228, 382/305; 707/821–831; 358/403
See application file for complete search history.

(56) References Cited

U.S. PATENT DOCUMENTS

| | | | |
|---|---|---|---|
| 6,754,389 B1 * | 6/2004 | Dimitrova et al. | 382/224 |
| 7,298,895 B2 * | 11/2007 | Loui et al. | 382/171 |
| 7,440,638 B2 * | 10/2008 | Nagahashi et al. | 382/305 |
| 7,477,805 B2 * | 1/2009 | Ohtsuka et al. | 382/305 |
| 7,646,895 B2 * | 1/2010 | Haupt et al. | 382/115 |
| 7,716,259 B2 * | 5/2010 | Aridome et al. | 707/822 |
| 2005/0141849 A1 * | 6/2005 | Tsue et al. | 386/4 |
| 2006/0056737 A1 * | 3/2006 | Ohtsuka et al. | 382/305 |
| 2006/0222244 A1 * | 10/2006 | Haupt et al. | 382/220 |
| 2006/0279555 A1 * | 12/2006 | Ono | 345/173 |
| 2010/0073396 A1 * | 3/2010 | Wang et al. | 345/591 |
| 2010/0088617 A1 * | 4/2010 | Watanabe | 715/762 |

* cited by examiner

*Primary Examiner* — Aaron Carter
(74) *Attorney, Agent, or Firm* — Wolf, Greenfield & Sacks, P.C.

(57) ABSTRACT

An information processing apparatus includes clustering means for performing clustering on multiple images so as to more strongly connect the images at a closer distance based on the distances determined by metadata of the images, and grouping means for grouping the images such that the number of images of each group can be equal to or lower than a predetermined number of images in accordance with the strength of connection among the images.

6 Claims, 21 Drawing Sheets

$n1_{min}=p1$
$n1_{max}=p2$ $td_{p1o2} > td_{o2p3}$ $n1_{max}=p3$ $n2_{min}=p2$
$n2_{max}=p3$ $n3_{min} = p1$
$n3_{max} = p4$ $td_{n1_{max}p4} > td_{p4p5}$

INFORMATION PROCESSING APPARATUS, METHOD AND PROGRAM

CROSS REFERENCES TO RELATED APPLICATIONS

The present invention contains subject matter related to Japanese Patent Applications JP 2006-252238 filed in the Japanese Patent Office on Sep. 19, 2006, the entire contents of which being incorporated herein by reference.

BACKGROUND OF THE INVENTION

1. Field of the Invention

The present invention relates to an information processing apparatus, method and program and, in particular, to an information processing apparatus, method, and program that allows grouping contents properly and creating new contents.

2. Description of the Related Art

In recent years, various clustering technologies have been proposed for grouping recorded contents in machines such as an HDD (Hard Disk Drive) recorder and a personal computer. By sorting recorded images by using the technology, contents may be created like an album of photographs shot by a silver salt camera.

Storing photographs shot by a silver salt camera may include dividing the photographs into albums or pages based on events, shot places and dates, for example. A user can lay out photographs with closer relationships regarding events, places, dates or the like on each page in accordance with the size of the page or the number of photographs.

By the way, a technology has been proposed that converts film images of shot photographs to electronic images, saves and manages them as electronic data by adding additional information such as the shot dates and places thereto and stores the photograph film recording the images in association with the electronic data (refer to JP-A-10-143631).

SUMMARY OF THE INVENTION

However, in an HDD recorder or a personal computer, it is difficult to sort contents such as photographs and moving images properly in accordance with a request by a user unlike an album for photographs shot by a silver salt camera.

Accordingly, it is desirable to allow sorting multiple images into meaningful groups.

According to an embodiment of the present invention, there is provided an information processing apparatus including clustering means for performing clustering on multiple images so as to more strongly connect the images at a closer distance based on the distances determined by metadata of the images, and grouping means for grouping the images such that the number of images of each group can be equal to or lower than a predetermined number of images in accordance with the strength of connection among the images.

The metadata may describe the shot times when the images are shot. The distance may refer to the time interval between the shot times. The clustering means may be caused to perform clustering on the multiple images by connecting the images in a binary tree structure so as to reduce the number of nodes among the images with smaller time intervals between the shot times based on the shot times when the images are shot. The grouping means may be caused to group the images by dividing the binary tree to which the images are connected into subtrees to which a predetermined or smaller number of images are connected.

The information processing apparatus may further include correcting means for correcting the numbers of images contained in adjacent subtrees of the divided subtrees when the numbers of images, which are shot within a predetermined time range and are contained in the adjacent subtrees, are unbalanced.

The metadata may describe shot places where the images are shot. The distance may refer to the physical distance between/among the shot places.

The metadata may describe a keyword relating to each of the images. The distance may refer to the degree of similarity between/among the keywords.

The information processing apparatus may further include creating means for creating contents in which the grouped images are laid out in groups.

The creating means may be caused to define the layout of the images in the contents to display the contents based on the number of the grouped images.

The information processing apparatus may further include display control means for controlling the display of contents.

According to another embodiment of the invention, there is provided an information processing method including the steps of performing clustering on multiple images so as to more strongly connect the images at a closer distance based on the distances determined by metadata of the images, and grouping the images such that the number of images of each group can be equal to or lower than a predetermined number of images in accordance with the strength of connection among the images.

According to another embodiment of the invention, there is provided a program including the steps of performing clustering on multiple images so as to more strongly connect the images at a closer distance based on the distances determined by metadata of the images, and grouping the images such that the number of images of each group can be equal to or lower than a predetermined number of images in accordance with the strength of connection among the images.

According to another embodiment of the invention, clustering is performed on multiple images so as to more strongly connect the images at a closer distance based on the distances determined by metadata of the images, and the images are grouped such that the number of images of each group can be equal to or lower than a predetermined number of images in accordance with the strength of connection among the images.

DESCRIPTION OF THE PREFERRED EMBODIMENTS

Before describing embodiments of the invention below, correspondences between constituent features of the invention and embodiments described and illustrated in the specification and drawings will be described as follows. This description is for ensuring that embodiments supporting the invention are described and illustrated in the specification or drawings. Therefore, embodiments described or illustrated in the specification or a drawing but not described herein as an embodiment corresponding to constituent features of the invention, if any, do not mean that they do not correspond to the constituent features. Conversely, embodiments described herein as those corresponding to the constituent features do not mean that the embodiments do not correspond to constituent features excluding the constituent features.

An information processing apparatus according to an embodiment of the invention includes clustering means (such as a clustering section 91 in FIG. 2) for performing clustering on multiple images so as to more strongly connect the images at a closer distance based on the distances determined by metadata of the images, and grouping means (such as a grouping processing section 92 in FIG. 2) for grouping the images such that the number of images of each group can be equal to or lower than a predetermined number of images in accordance with the strength of connection among the images.

The metadata may describe the shot times when the images are shot. The distance may refer to the time interval between the shot times. The clustering means may be caused to perform clustering on the multiple images by connecting the images in a binary tree structure so as to reduce the number of nodes among the images with smaller time intervals between the shot times based on the shot times when the images are shot (such as step S13 in FIG. 13). The grouping means may be caused to group the images by dividing the binary tree to which the images are connected into subtrees to which a predetermined or smaller number of images are connected (such as step S16 in FIG. 13).

The information processing apparatus may further include correcting means (such as a correcting section 93 in FIG. 2) for correcting the numbers of images contained in adjacent subtrees of the divided subtrees when the numbers of images, which are shot within a predetermined time range and are contained in the adjacent subtrees, are unbalanced.

The metadata may describe shot places where the images are shot. The distance may refer to the physical distance between/among the shot places.

The metadata may describe a keyword relating to each of the images. The distance may refer to the degree of similarity between/among the keywords.

The information processing apparatus may further include creating means (such as a contents creating section 55 in FIG. 2) for creating contents in which the grouped images are laid out in groups.

Figure 13:
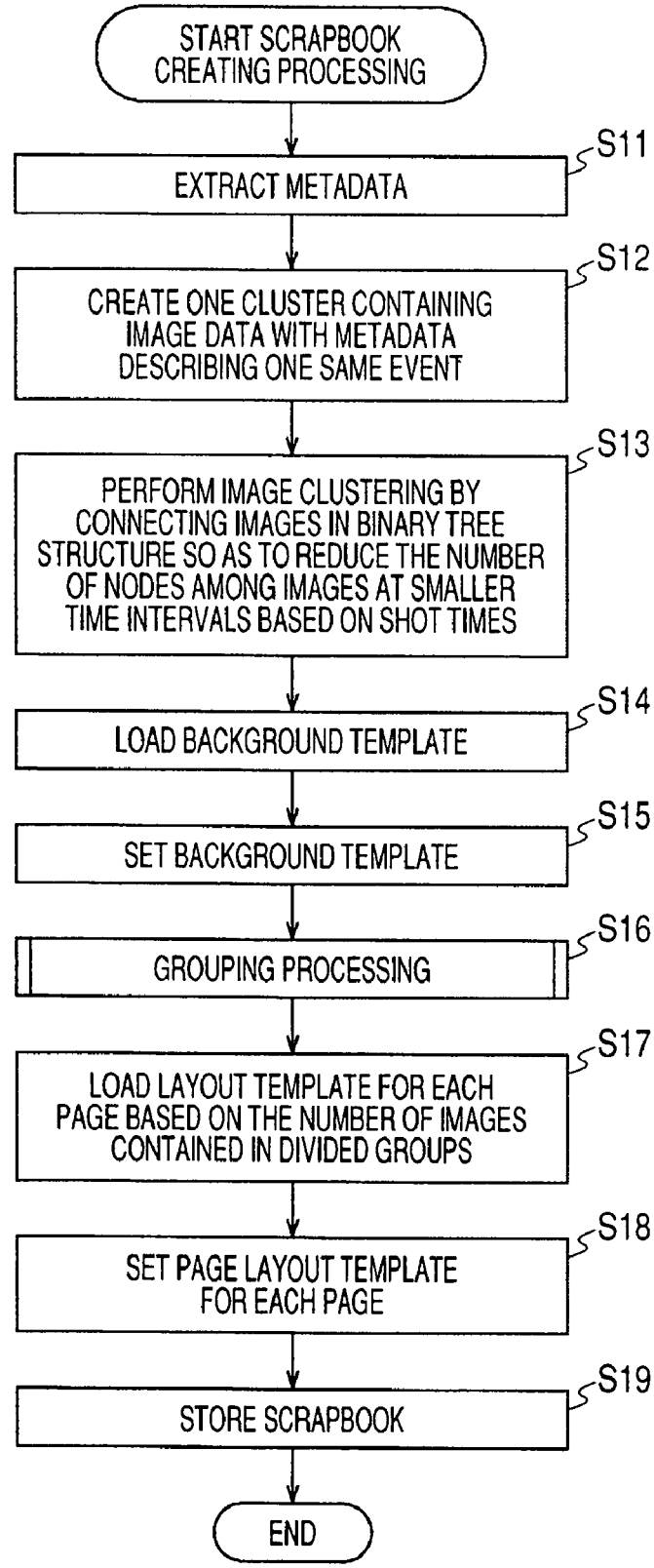
FIG. 13 is a flowchart describing an example of processing of creating a scrapbook.

The creating means may be caused to define the layout of the images in the contents to display the contents based on the number of the grouped images (such as step S18 in FIG. 13).

The information processing apparatus may further include display control means (such as a display control section 53 in FIG. 2) for controlling the display of contents.

An information processing method according to another embodiment of the invention includes the steps of performing clustering on multiple images so as to more strongly connect the images at a closer distance based on the distances determined by metadata of the images (such as step S13 in FIG. 13), and grouping the images such that the number of images of each group can be equal to or lower than a predetermined number of images in accordance with the strength of connection among the images (such as step S16 in FIG. 13).

A program according to another embodiment of the invention includes the steps of performing clustering on multiple images so as to more strongly connect the images at a closer distance based on the distances determined by metadata of the images (such as step S13 in FIG. 13), and grouping the images such that the number of images of each group can be equal to or lower than a predetermined number of images in accordance with the strength of connection among the images (such as step S16 in FIG. 13).

Figure 1:
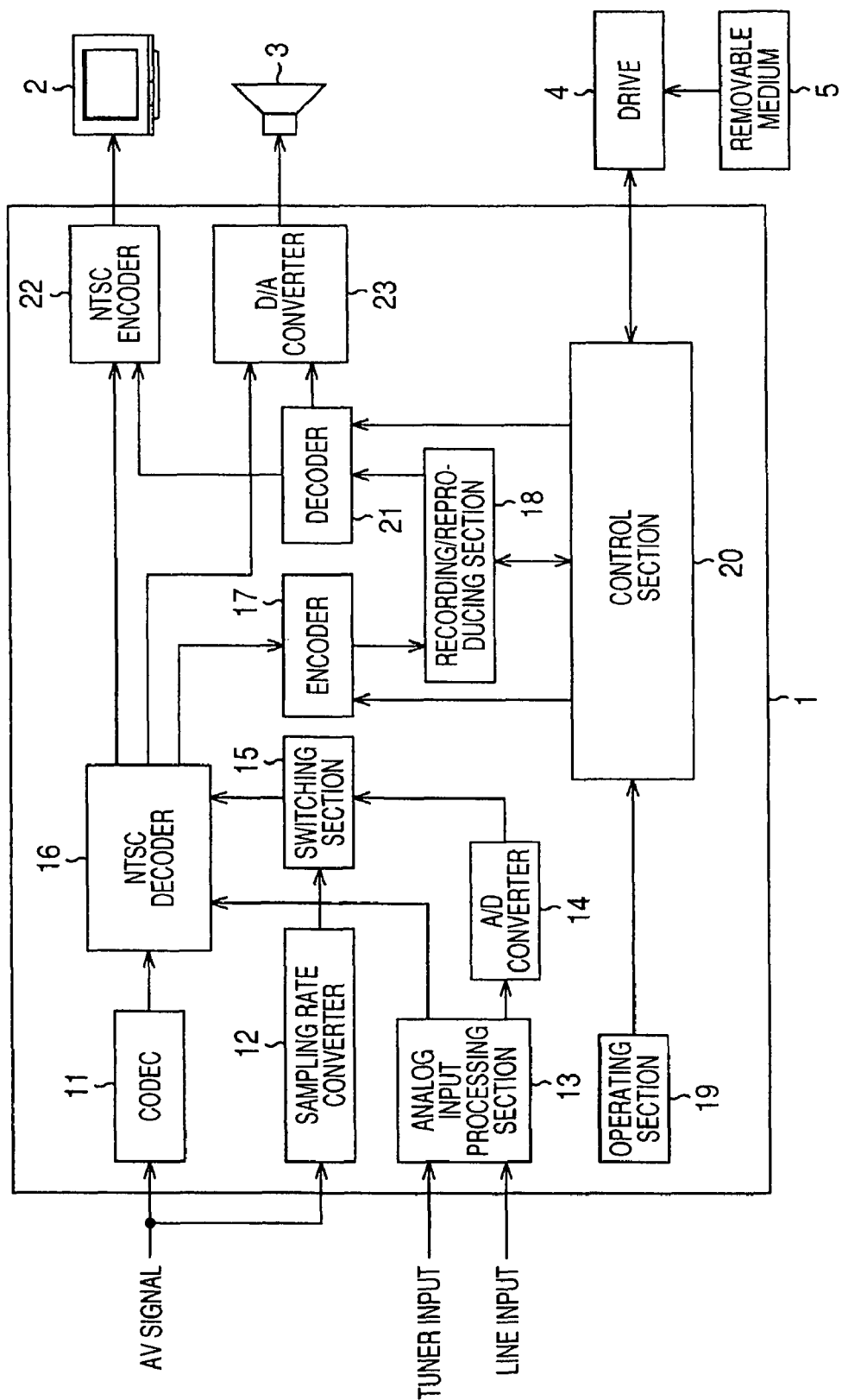
FIG. 1 is a diagram showing an example of an HDD recorder, which is an embodiment of the invention.

FIG. 1 is a block diagram showing an example of the construction of an HDD recorder, which is an embodiment of the invention.

An HDD recorder 1 in FIG. 1 records or reproduces an AV (Audio Video) signal supplied from an external device, not shown, or video signals and voice signals input as analog signals supplied from an analog tuner, not shown, or a line tuner, not shown. The HDD recorder 1 outputs the reproduced video signals to an externally connected monitor 2. The HDD recorder 1 outputs the reproduced voice signals to an externally connected speaker 3.

The external device that supplies AV signals may be an external device connected thereto through "i.LINK (Registered Trademark of Sony Corporation)", a digital BS (Broadcasting Satellite) tuner or a digital CS (Communications Satellite) tuner, a digital video camera, a digital still camera or a scanner, for example.

A drive 4 is connected to the HDD recorder 1 as required. A removable medium 5 is installed to the drive 4 as required to exchange data therebetween. The removable medium 5 may be a magnetic disk (including a flexible disk), an optical disk (including a CD-ROM (Compact Disk-Read Only Memory) and a DVD (Digital Versatile Disk)), a magnetooptical disk, or a semiconductor memory.

The HDD recorder 1 in FIG. 1 includes a codec 11, a sampling rate converter 12, an analog input processing section 13, an A/D (Analog to Digital) converter 14, a switching section 15, an NTSC (National Television System Committee) decoder 16, an encoder 17, a recording/reproducing section 18, an operating section 19, a control section 20, a decoder 21, an NTSC encoder 22, and a D/A (Digital to Analog) converter 23.

The codec 11 decompresses digital video signals of the AV signals supplied from an external device, not shown, and supplies them to the NTSC decoder 16.

The sampling rate converter 12 converts the sampling rate for digital audio signals of the AV signals supplied from an external device, not shown, to a different sampling rate. The sampling rate converter 12 supplies the converted digital audio signals to the switching section 15.

The analog input processing section 13 selects one of analog signals supplied from an analog tuner, not shown, and a line tuner, not shown, based on the signal, which is supplied from the control section 20, indicating an operation by a user on the operating section 19. The analog input processing section 13 supplies analog video signals of the selected analog signals to the NTSC decoder 16. The analog input processing section 13 further supplies analog audio signals of the selected analog signals to the A/D converter 14.

The A/D converter 14 A/D converts the analog audio signals supplied from the analog input processing section 13. The A/D converter 14 supplies the digital audio signals resulting from the A/D conversion to the switching section 15.

The switching section 15 selects one of the digital audio signals supplied from the sampling rate converter 12 and the digital audio signals supplied from the A/D converter 14 based on the signal, which is supplied from the control section 20, indicating an operation from a user on the operating section 19. The switching section 15 supplies the selected digital audio signals to the NTSC decoder 16.

The NTSC decoder 16 converts the digital video signals supplied from the codec 11 or the analog video signals input from the analog input processing section 13 to digital video signals in NTSC scheme. The NTSC decoder 16 synthesizes the converted digital video signals in NTSC scheme and the digital audio signals supplied from the switching section 15.

In order to record video signals and voice signals input to the HDD recorder 1, the NTSC decoder 16 supplies the digital AV signals, which are the synthesized signals, to the encoder 17. On the other hand, in order to reproduce the video signals and voice signals input to the HDD recorder 1 directly without recording, the NTSC decoder 16 supplies the digital AV signals, which are the synthesized signals, to the NTSC encoder 22 and the D/A converter 23, which will be described later.

The encoder 17 performs encoding processing based on a predetermined scheme such as MPEG (Moving Picture Experts Group) scheme on the digital AV signals supplied from the NTSC decoder 16. The encoder 17 supplies the compressed and encoded signal data resulting from the encoding processing to the recording/reproducing section 18.

The recording/reproducing section 18 may be configured as a hard disk or an optical disk, for example. The recording/reproducing section 18 records the signal data supplied from the encoder 17. The recording/reproducing section 18 supplies the recorded signal data to the decoder 21. In other words, the recording/reproducing section 18 reproduces the recorded signal data.

The operating section 19 may include operation buttons, keys and a touch panel, for example. A user operates the operating section 19 to input an instruction to the HDD recorder 1. The operating section 19 supplies the signal indicating an operation by a user to the control section 20 in accordance with the operation by the user.

The control section 20 may include a microprocessor and controls the entire HDD recorder 1 based on the signal, which is supplied from the operating section 19, indicating an operation by a user.

The decoder 21 performs decoding processing based on the scheme corresponding to the scheme above, such as MPEG (Moving Picture Experts Group) scheme on the signal data supplied from the recording/reproducing section 18. The decoder 21 supplies digital video signals of the expanded and decoded digital AV signals resulting from the processing to the NTSC encoder 22. The decoder 21 further supplies digital audio signals of the expanded and decoded digital AV signals resulting from the processing to the D/A converter 23.

The NTSC encoder 22 converts the digital video signals supplied from the decoder 21 to video signals in NTSC scheme. The NTSC encoder 22 supplies the converted video signals to the monitor 2.

The D/A converter 23 D/A converts the digital audio signals supplied from the decoder 21. The D/A converter 23 supplies the audio signal resulting from the conversion to the speaker 3.

This construction allows the HDD recorder 1 to record or reproduce input video signals and voice signals.

Figure 2:
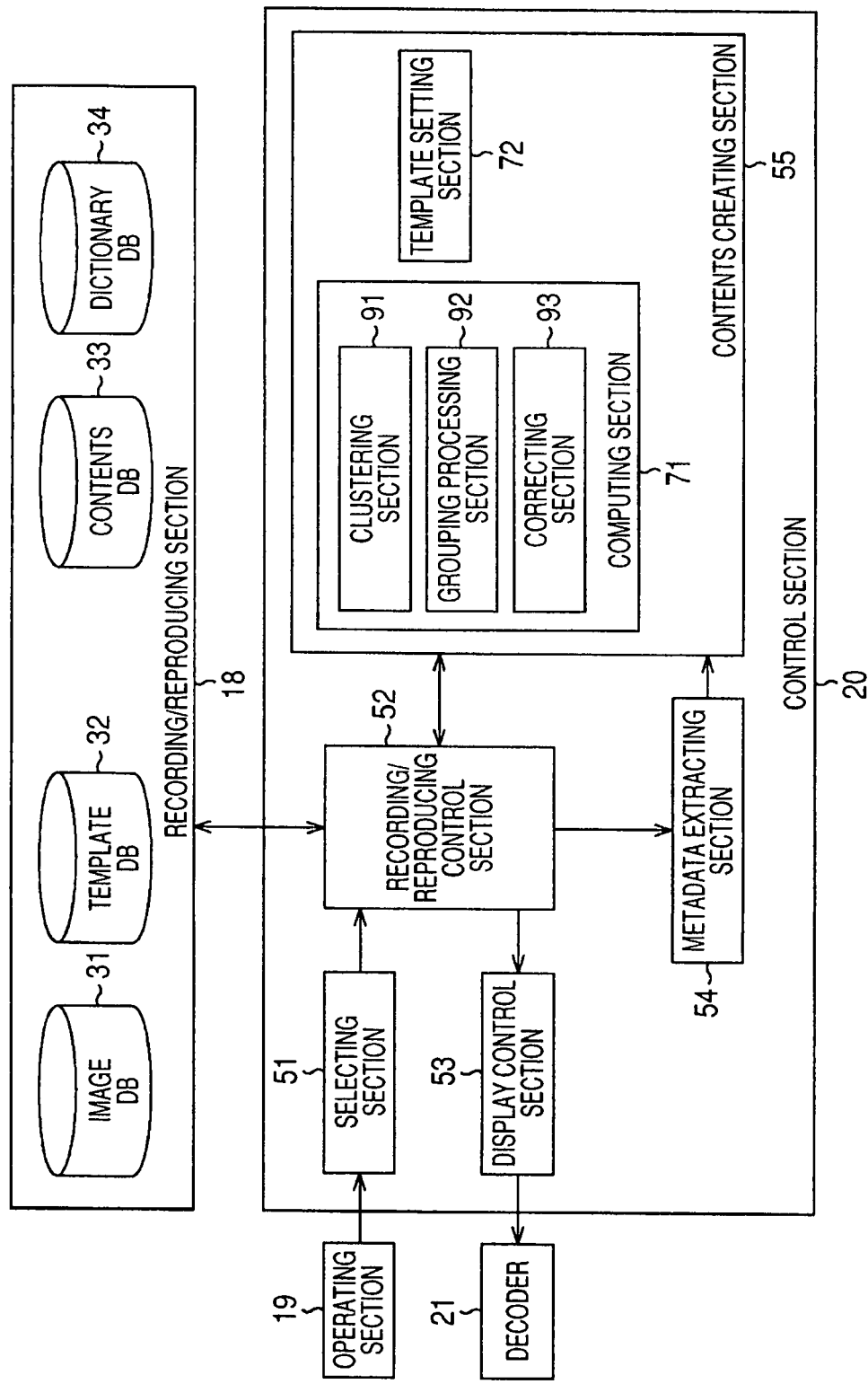
FIG. 2 is a block diagram showing an example of the configuration of the control section of the HDD recorder.

FIG. 2 is a block diagram showing an example of the constructions of the recording/reproducing section 18 and control section 20 of the HDD recorder 1 in FIG. 1.

The recording/reproducing section 18 includes an image database (DB) 31, a template database (DB) 32, a contents database (DB) 33 and a dictionary database (DB) 34. The image database 31, template database 32, contents database 33 and dictionary database 34 will be called image DB 31, template DB 32, contents DB 33 and dictionary DB 34, respectively, hereinafter.

The image DB 31 stores image data, which is data of an image supplied from the encoder 17 in FIG. 1, and metadata indicating the attribute of the image with a correspondence therebetween.

The template DB 32 records a background template and a layout template. The background template is data of a background image to be the background of the image placed on a scrapbook, which is contents recorded in the contents DB 33, when the scrapbook is displayed. The layout template is information defining the layout of images in a scrapbook. The template DB 32 records a background template and metadata indicating the attribute thereof with a correspondence therebetween.

The contents DB 33 records data of the scrapbook, which is contents including grouped images are laid out in groups. The details of the contents will be described later.

The dictionary DB 34 records, as words, data of a dictionary such as a Japanese language dictionary, an English-Japanese dictionary, a Japanese-English dictionary and a synonym dictionary.

The control section 20 includes a selecting section 51, a recording/reproducing control section 52, a display control section 53, a metadata extracting section 54, and a contents creating section 55.

The selecting section 51 supplies the information indicating the detail operated by a user based on the signal, which is supplied from the operating section 19, indicating the operation by a user. For example, the selecting section 51 may supply information describing an image or contents selected by a user to the recording/reproducing control section 52 based on the signal, which is supplied from the operating section 19, indicating an operation by a user selecting an image or scrapbook displayed on the monitor 2.

The selecting section 51 selects predetermined image data from image data of the image loaded to the recording/reproducing control section 52.

The recording/reproducing control section 52 controls the recording or reproduction to be performed by the recording/reproducing section 18. The recording/reproducing control section 52 loads data of image data, a background template, a layout template or a scrapbook from the recording/reproducing section 18. For example, the recording/reproducing control section 52 may load image data stored in the recording/reproducing section 18 based on the information, which is supplied from the selecting section 51, indicating a detail operated by a user.

The recording/playing control section 52 supplies the loaded image data, background template, layout template or scrapbook to the contents creating section 55.

The display control section 53 controls the decoding processing by the decoder 21 based on the image data or the data of a scrapbook, which is loaded from the recording/reproducing control section 52.

The metadata extracting section 54 extracts metadata added to image data loaded to the recording/reproducing control section 52. The metadata extracting section 54 supplies the extracted metadata to the contents creating section 55.

The contents creating section 55 creates a scrapbook, which is contents in which grouped images are laid out in groups. The contents creating section 55 includes a computing section 71 and a template setting section 72.

The computing section 71 includes a clustering section 91, a grouping processing section 92 and a correcting section 93.

The clustering section 91 performs clustering on images based on a predetermined condition for grouping images, that is, creating a cluster of images. The condition for creating a cluster of images may be selected by a user from prepared multiple conditions. For example, the clustering section 91 may perform clustering on images based on the metadata supplied from the metadata extracting section 54. More specifically, the clustering section 91 may create one cluster containing image data of images to which metadata describing one same event is added, for example.

The clustering section 91 performs clustering on multiple images to be grouped so as to more strongly connect the images at a closer distance based on the distances determined by metadata of the images. The metadata here may describe the shot times when the images are shot. The distance between images may refer to the time interval of the shot times between the shot images. In other words, for example, the clustering section 91 may perform clustering on the images by connecting the images in a binary tree structure so as to reduce the number of nodes among the multiple images contained in one cluster with smaller time intervals of the shot times based on the shot times when the images are shot.

For example, in the binary tree structure, the strength of the connection among images increases as the number of nodes among the images decreases. The processing of creating the binary tree structure will be described later.

The grouping processing section 92 groups images such that the number of images of each group can be equal to or lower than a predetermined number of images in accordance with the strength of connection among the images. For example, the grouping processing section 92 may group images by dividing the binary tree to which the images are connected in one cluster into subtrees to which a predetermined or smaller number of images are connected.

More specifically, the grouping processing section 92 determines, from the viewpoint of the top node of a binary tree to which images are connected, whether the number of images connected by the node is higher than the predetermined number of images or not. If so, the binary tree is divided into two binary trees with the child node of the node as the top to group the images. The grouping processing section 92 performs the same processing on the divided binary trees.

The correcting section 93 corrects the numbers of images contained in adjacent subtrees of the divided subtrees when the numbers of images, which are shot within a predetermined time range and are contained in the adjacent subtrees, are unbalanced. In other words, the correcting section 93 corrects the number of images contained in adjacent groups in time of the groups of grouped images, which are images shot in a predetermined time range, when the numbers of images, which are contained in the adjacent groups, are unbalanced.

More specifically, the correcting section 93 corrects the number of images contained in adjacent binary trees of the divided binary trees when the numbers of images, which are images shot within a predetermined time range and are contained in the adjacent binary trees, are unbalanced. For example, when the difference between the numbers of images, which are images in one cluster, that is, images shot in predetermined ten minutes in a predetermined event and are contained in adjacent two binary trees is equal to or higher than a predetermined threshold value, the correcting section 93 corrects the numbers of images contained in the adjacent binary trees by connecting the binary tree containing the lower number of images and the binary tree, which is closer in distance to, that is, at a smaller time interval from the binary tree containing a lower number of images of the two binary trees resulting from the division of the binary tree containing the higher number of images.

The template setting section 72 causes the recording/reproducing control section 52 to load, from the recording/reproducing section 18, the background template in accordance with the metadata supplied from the metadata extracting section 54. The template setting section 72 further causes the recording/reproducing control section 52 to load, from the recording/reproducing section 18, the layout template in accordance with the number of grouped images resulting from the grouping by the grouping processing section 92. The template setting section 72 sets the loaded background template and layout template in a created cluster.

The contents creating section 55 causes the contents DB 33 of the recording/reproducing section 18 to record, through the recording/reproducing control section 52, the scrapbook in which grouped multiple images are laid out in groups and the background template and layout template are set.

Figure 3:
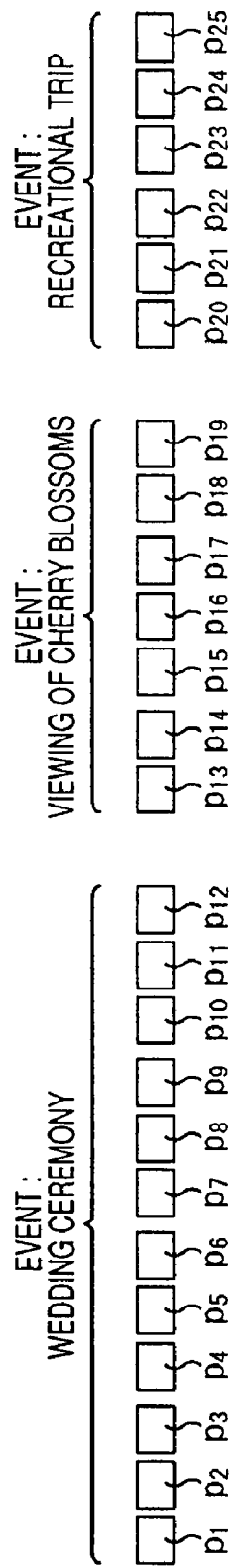
FIG. 3 is a diagram showing examples of the clusters of images.

FIG. 3 is a diagram showing an example of the groups (clusters) of images.

In FIG. 3, images p1 to p25 refer to images recorded in the image DB 31 of the recording/reproducing section 18. One square in FIG. 3 refers to one image. Metadata is added to each of the images p1 to p25.

In the example in FIG. 3, "WEDDING CEREMONY" is added to the images p1 to p12 as metadata describing an event thereof. "VIEWING OF CHERRY BLOSSOMS" is added to the images p13 to p19 as metadata describing an event thereof. "RECREATIONAL TRIP" is added to the images p20 to p25 as metadata describing an event thereof.

The clustering section 91 performs clustering on images based on the metadata describing the events added to the images p1 to p25.

More specifically, as shown in FIG. 3, the clustering section 91 creates a cluster containing the images p1 to p12, a cluster containing the images p13 to p19 and a cluster containing the images p20 to p25.

For example, the images contained in each of the cluster created in this way are entirely managed by a folder for each cluster. More specifically, the images p1 to p12 are managed by a folder under the name, "WEDDING CEREMONY". The images p13 to p19 are managed by a folder under the name, "VIEWING OF CHERRY BLOSSOMS". The images p20 to p25 are managed by a folder under the name, "RECREATIONAL TRIP". For example, the information describing the images belonging to each of the clusters may be recorded in the recording/reproducing section 18.

Next, details of the processing of creating a binary tree structure to be performed by the clustering section 91 will be described.

With Reference to FIGS. 4 to 12, the processing of creating a binary tree structure for 100 images p1 to p100 will be described.

In FIGS. 4 to 12, one circle with the letter "p" and a number inside refers to one image, and one circle with the letter "n" and a number inside refers to one node. The right side of the figures is later in time than the left side. Here, a case will be described in which the images p1 to p100 are to be clustered in order of shot times (where the image p1 is the oldest data and the image p100 is the newest data).

Figure 4:
FIG. 4 is a diagram illustrating the creation of a binary tree structure.

When the image p1 obtained by the first shot is inserted to a tree (that is, when the image p1 becomes the target of clustering) before the clustering is performed, the image p1 itself becomes the root node as shown in FIG. 4 since no other nodes initially exist to be the root of the tree.

Figure 5:
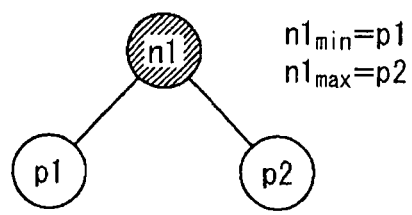
FIG. 5 is a diagram subsequent to FIG. 4, which illustrates the creation of a binary tree structure.

When the image p2 shot subsequently to the image p1 is inserted to the tree, a node n1 is newly created as shown in FIG. 5. Since the shot time of the image p2 is later than the shot time of the image p1, the image p1 is connected to the node n1 as the child node on the left side, and the image p2 is connected to the node n1 as the child node on the right side. The node n1 becomes the root node instead of the image p1.

The shot time of the image p1 is recorded as the minimum time of the node n1, and the shot time of the image p2 is recorded as the maximum time. Alternatively, as the time of a node, the average value (or middle time) of the shot times of two child nodes of the node, which is the parent node of them, may be recorded.

Figure 6:
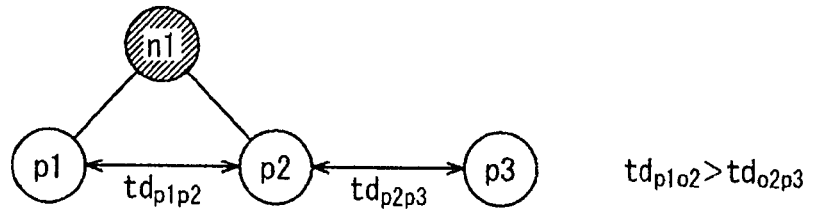
FIG. 6 is a diagram subsequent to FIG. 5, which illustrates the creation of a binary tree structure.
Figure 7:
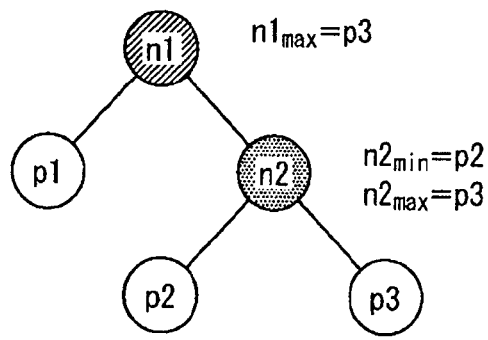
FIG. 7 is a diagram subsequent to FIG. 6, which illustrates the creation of a binary tree structure.

When the image p3 shot subsequently to the image p2 is inserted to the tree, and when the time interval $td_{p2p3}$ between the shot time of the image p3 and the shot time of the image p2 is smaller than the time interval $td_{p1p2}$ between the shot time of the image p2 and the shot time of the image p1, as shown in FIG. 6, a node n2 is newly created as shown in FIG. 7. The image p2 is connected to the node n2 as the child node on the left side, and the image p3 is connected to the node n2 as the child node on the right side. The node n2 is connected to the node n1 as the child node on the right side instead of the image p2.

The shot time of the image p2 is recorded as the minimum time of the node n2, and the shot time of the image p3 is recorded as the maximum time. Here, the maximum time of the node n1, which is the parent node of the node n2, is overwritten by the shot time of the image p3.

Figure 8:
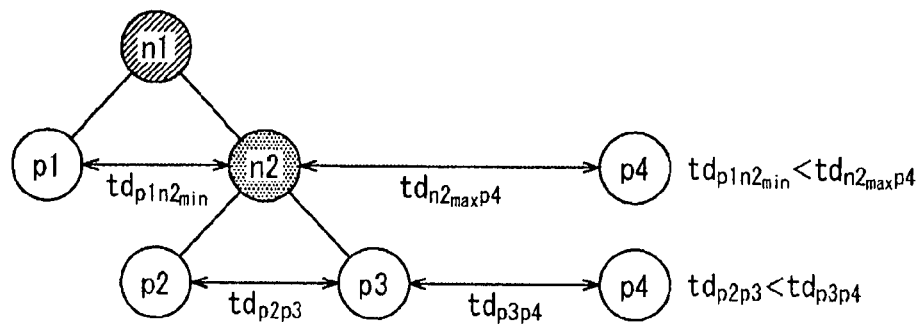
FIG. 8 is a diagram subsequent to FIG. 7, which illustrates the creation of a binary tree structure.
Figure 9:
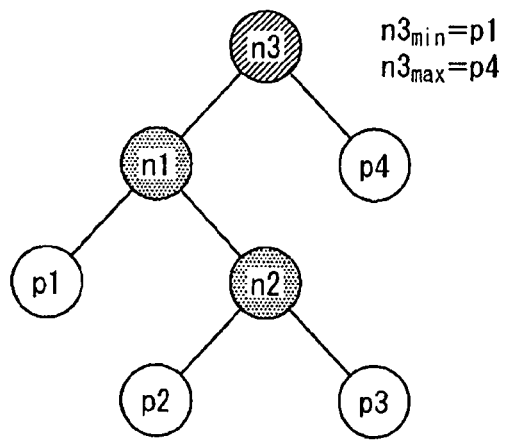
FIG. 9 is a diagram subsequent to FIG. 8, which illustrates the creation of a binary tree structure.

When the image p4 shot subsequently to the image p3 is inserted to the tree, and when the time interval $td_{p3p4}$ between the shot time of the image p4 and the shot time of the image p3 is larger than the time interval $td_{p2p3}$ between the shot time of the image p3 and the shot time of the image p2 and the time interval $td_{n2maxp4}$ between the shot time of the image p4 and the maximum time of the node n2 is larger than the time interval $td_{p1n2min}$ between the minimum time of the node n2 and the shot time of the image p1, as shown in FIG. 8, a node n3 is newly created as a root node, as shown in FIG. 9. The node n1 is connected to the node n3 as the child node on the left side, and the image p4 is connected thereto as the child node on the right side.

The minimum time of the node n1 is recorded as the minimum time of the node n3, and the shot time of the image p4 is recorded as the maximum time.

Figure 10:
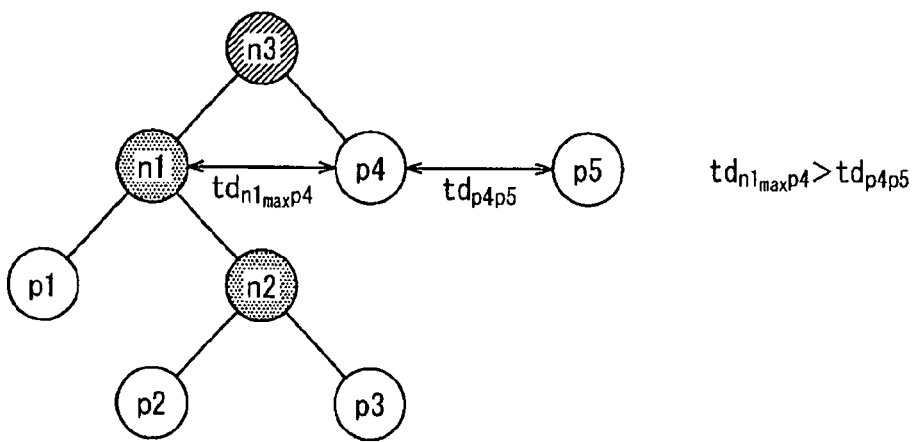
FIG. 10 is a diagram subsequent to FIG. 9, which illustrates the creation of a binary tree structure.
Figure 11:
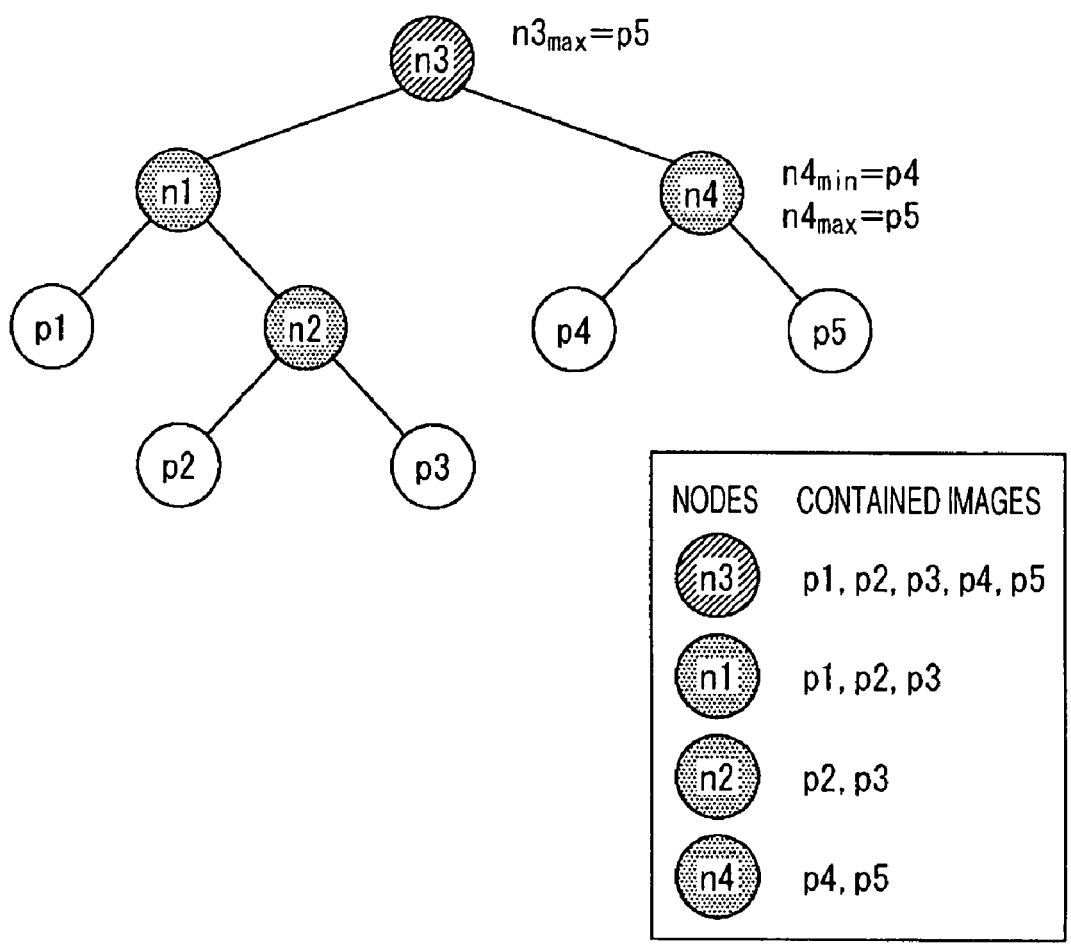
FIG. 11 is a diagram subsequent to FIG. 10, which illustrates the creation of a binary tree structure.

When the image p5 shot subsequently to the image p4 is inserted to the tree, and when the time interval $td_{n1maxp4}$ between the shot time of the image p4 and the maximum time of the node n1 is larger than the time interval $td_{p4p5}$ between the shot time of the image p5 and the shot time of the image p4, as shown in FIG. 10, a node n4 is newly created as shown in FIG. 11. The image p4 is connected to the node n4 as the child node on the left side, and the image p5 is connected to the node n4 as the child node on the right side. The node n4 is connected to the node n3 as the child node on the right side instead of the image p4.

The shot time of the image p4 is recorded as the minimum time of the node n4, and the shot time of the image p5 is recorded as the maximum time. Here, the maximum time of the node n3, which is the parent node of the node n4, is overwritten by the shot time of the image p5.

Currently, the binary structure includes the nodes n1 to n4 containing the five images p1 to p5.

Since the images contained in each of the nodes are images connected to the node directly or indirectly through another node, the images contained in the node n3 are the five images p1 to p5 in the created tree as shown in FIG. 11. The images contained in the node n1 are the three images p1 to p3. The images contained in the node n2 are the two images p2 and p3, and the images contained in the node n4 are the two images p4 and p5.

In this way, every time an image is newly inserted, images at a smaller time interval between the shot times or an image and a node at a smaller time interval between the shot time and a preset time are connected to hang from one same node.

Figure 12:
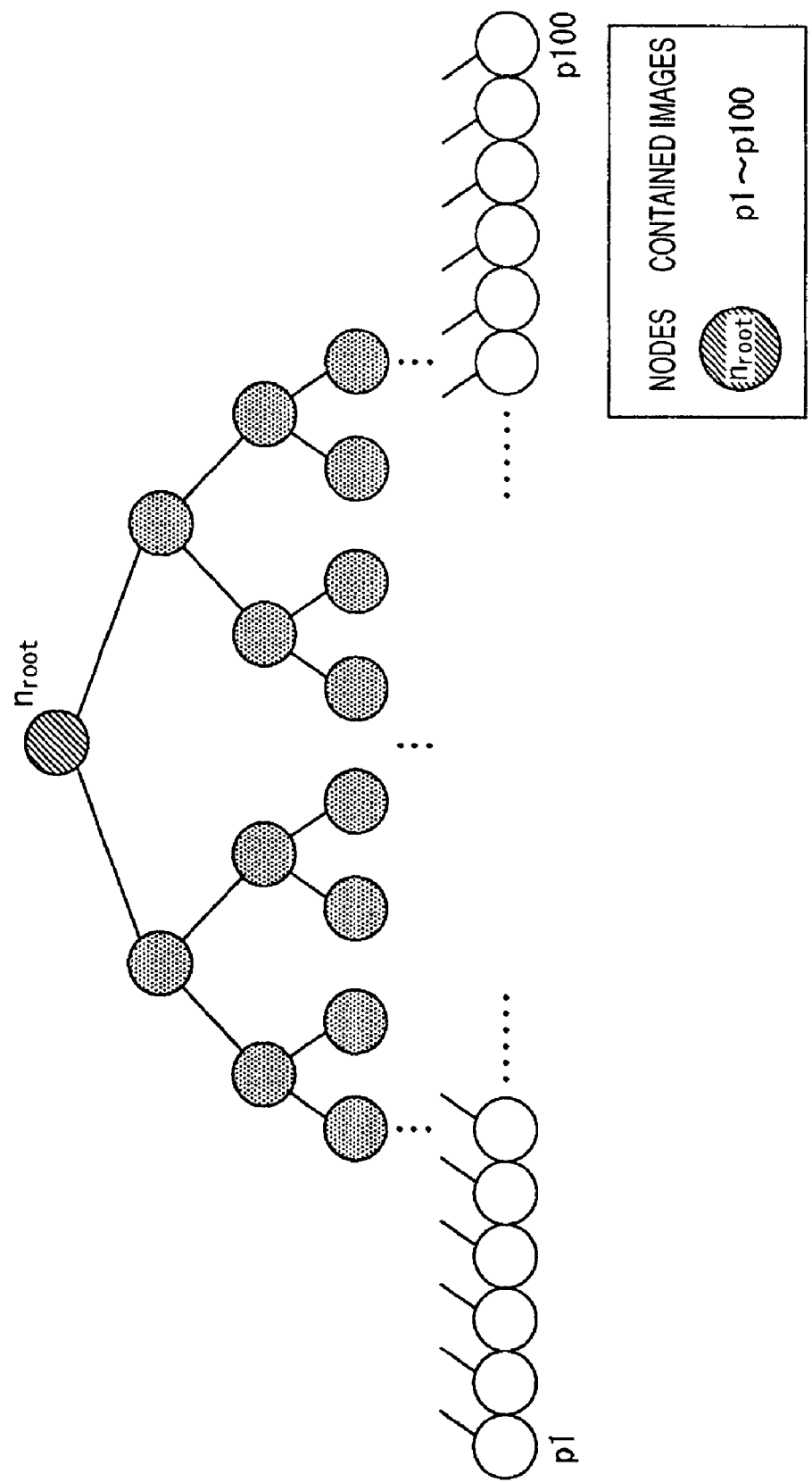
FIG. 12 is a diagram subsequent to FIG. 11, which illustrates the creation of a binary tree structure.

The same processing is performed also when shooting is performed repetitively and the images p6 to p100 are inserted to the tree. Then, finally, the binary tree structure as shown in FIG. 12 can be obtained which contains the images p1 to p100 in the root node $n_{root}$.

The processing may be performed in realtime every time shooting is performed or may be performed on images recorded in a predetermined folder, for example, based on an instruction by a user.

Next, the processing of creating a scrapbook in the HDD recorder 1 will be described.

The control section 20 of the HDD recorder 1 starts processing when the operating section 19 is operated and when the control section 20 obtains an instruction for the processing of creating a scrapbook.

FIG. 13 is a flowchart showing an example of the processing of creating a scrapbook in the HDD recorder 1.

In step S11, the selecting section 51 supplies information indicating clustering is to be performed based on metadata to the recording/reproducing control section 52 based on a signal indicating an operation by a user for selecting to perform clustering based on metadata, which is supplied from the operating section 19. The metadata extracting section 54 extracts the metadata added to the image data recorded in the image DB 31 through the recording/reproducing control section 52 based on the information supplied to the recording/reproducing control section 52. The metadata extracting section 54 supplies the extracted metadata to the contents creating section 55.

In step S12, the clustering section 91 of the computing section 71 performs clustering on images based on the metadata is supplied from the metadata extracting section 54. More specifically, the clustering section 91 creates one cluster containing images with the metadata describing one same event.

More specifically, for example, the clustering section 91 causes the recording/reproducing control section 52 to load image data of the images p1 to p25 recorded in the image DB 31. The clustering section 91 obtains from the recording/reproducing control section 52 the image data of the image p1 to p12 with "WEDDING CEREMONY", which is one of the metadata, supplied from the metadata extracting section 54 and creates one cluster.

In step S13, the clustering section 91 performs clustering on the images by connecting the images to a binary tree structure so as to reduce the number of nodes between images at a smaller time interval between the shot times based on the shot times when the multiple images are shot to be contained in one cluster. For example, the clustering section 91 creates the binary tree structure containing the images p1 to p12 in the manner described with reference to FIGS. 4 to 12.

In step S14, the template setting section 72 of the contents creating section 51 loads the background template with the metadata corresponding to the metadata added to the clustered image data. For example, the template setting section 72 causes the recording/reproducing control section 52 to load the background template based on "WEDDING CEREMONY", which is the metadata of the images p1 to p12, from the recording/reproducing section 18.

In step S15, the template setting section 72 sets the loaded background template.

Figure 14:
FIG. 14 is a diagram showing examples of background templates.

FIG. 14 is a diagram showing the construction of the background template. The background templates 111-1 to 111-3 shown in FIG. 14 have respective metadata. The template setting section 72 sets the background template having the metadata corresponding to the metadata added to the clustered image data.

In step S16, the grouping processing section 92 of the computing section 71 performs grouping processing of grouping images.

Now, with reference to FIGS. 15 to 19, the grouping processing will be described.

Figure 15:
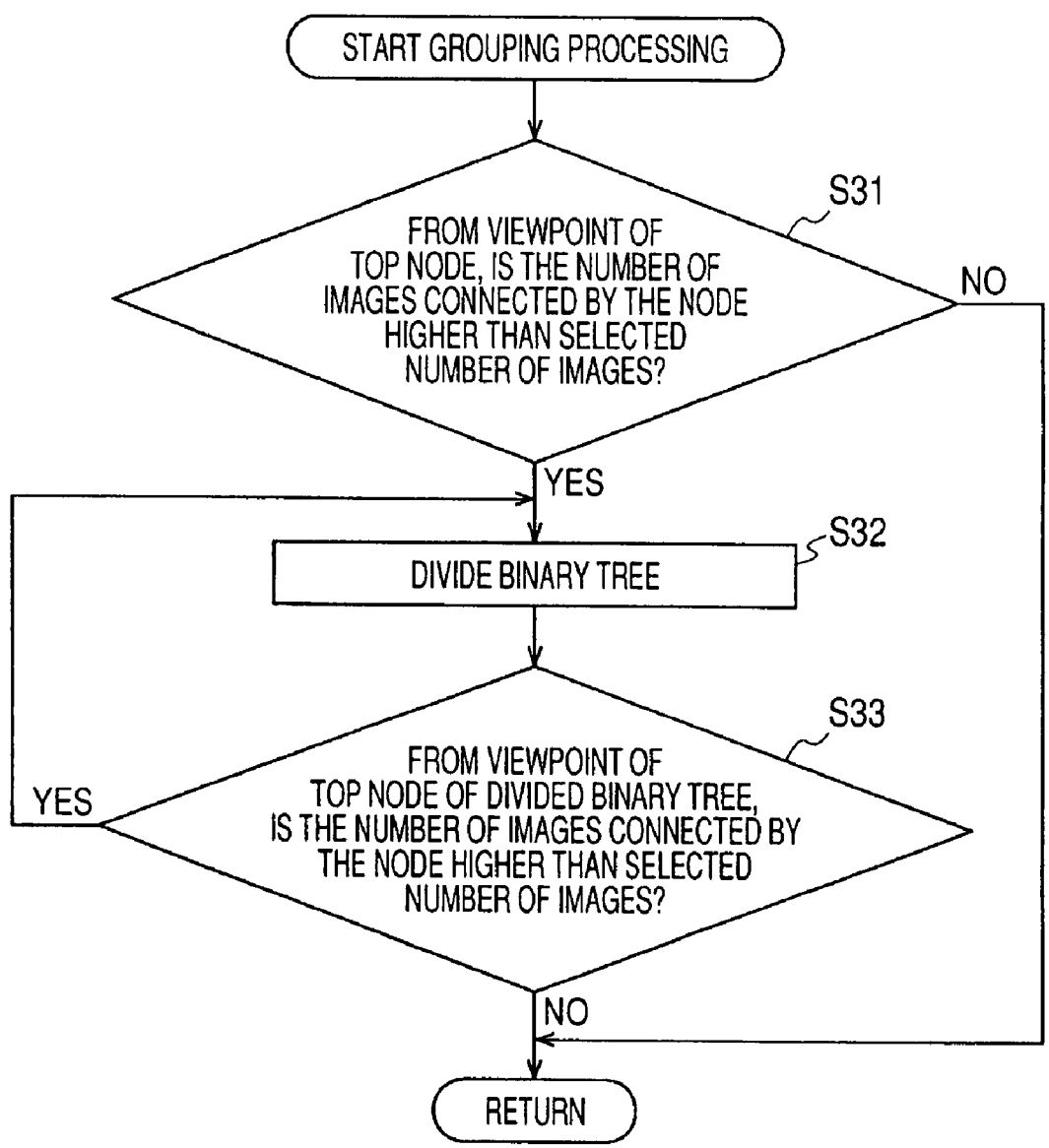
FIG. 15 is a flowchart describing grouping processing.

FIG. 15 is a flowchart describing details of the grouping processing corresponding to step S16 on the flowchart in FIG. 13.

In step S31, the grouping processing section 92 determines, from the viewpoint of the top node, whether the number of images connected by the node is higher than a predetermined number of images or not.

Figure 16:
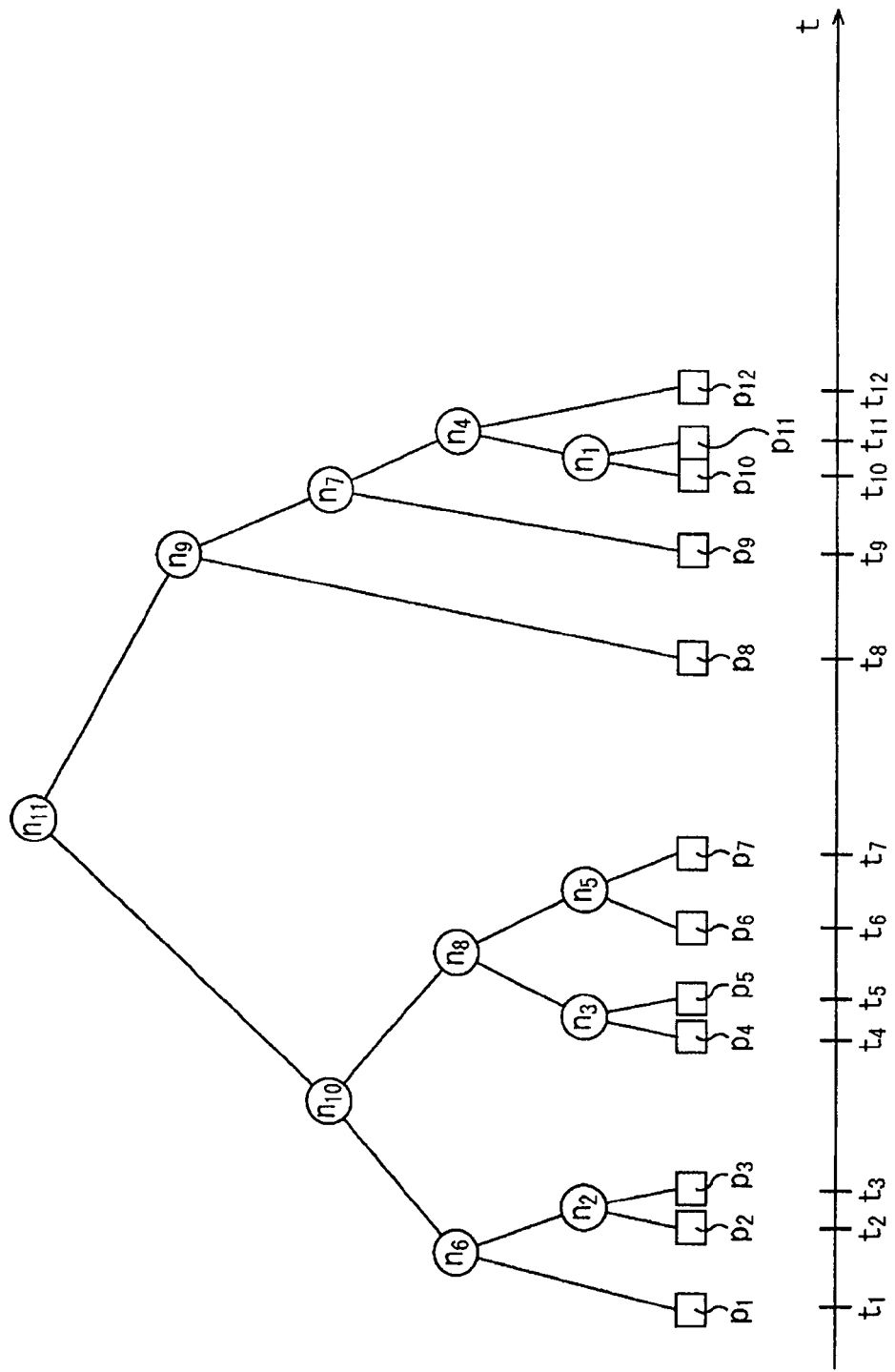
FIG. 16 is a diagram illustrating the division in a binary tree structure.
Figure 17:
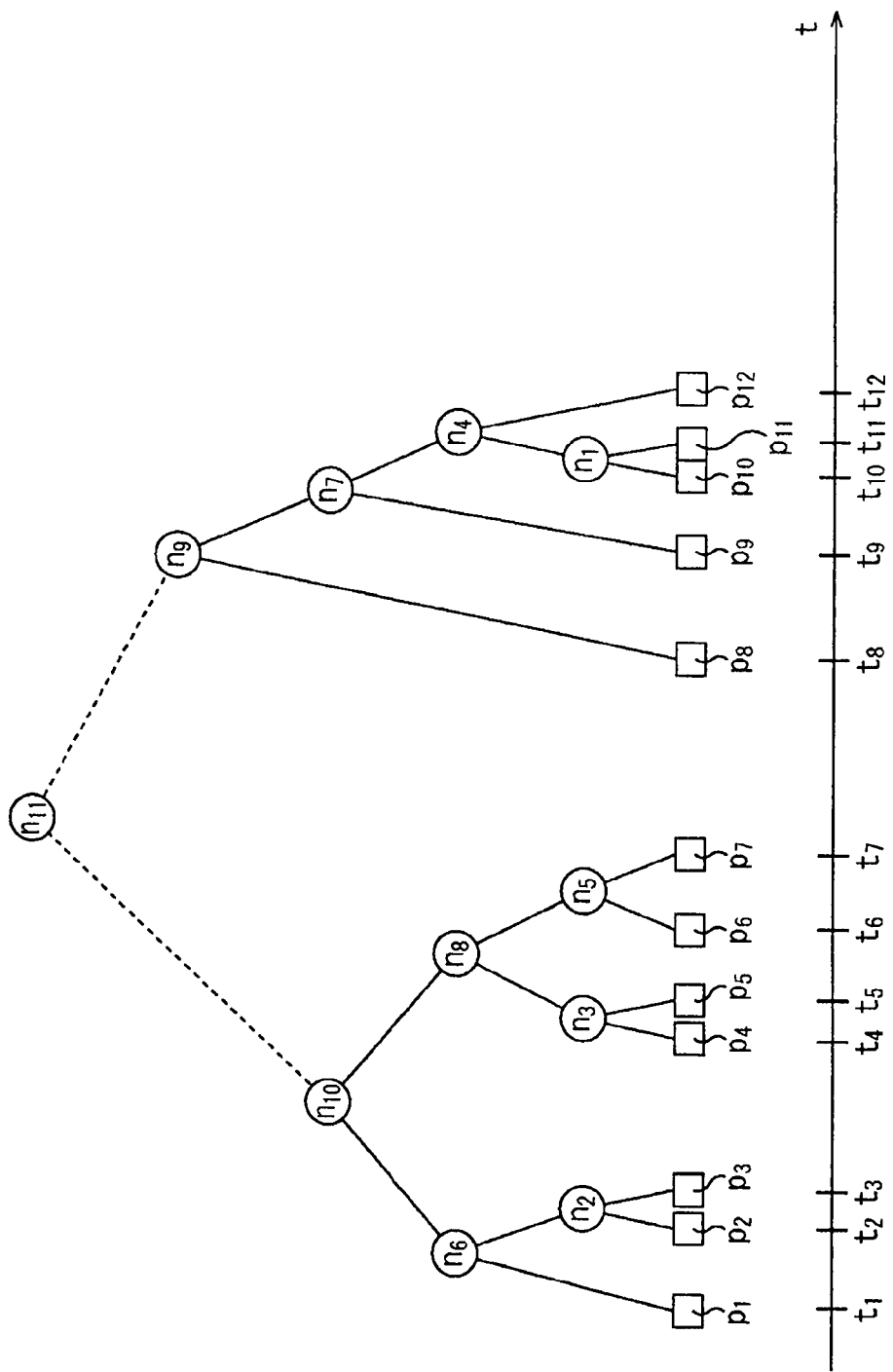
FIG. 17 is a diagram subsequent to FIG. 16, which illustrates the division in a binary tree structure.

FIG. 16 is a diagram showing the binary tree structure containing the images p1 to p12 in FIG. 3. The lower part of FIG. 16 shows a time axis, and times t1 to t12 indicate the shot times when the images p1 to p12 are shot. Like FIGS. 4 to 12, one circle in with the letter "n" and a number inside refers to one node. However, the number in the circle refers to the order of the length of the time interval between images or a node connected by the node for convenience, unlike the one indicating the order of creation in FIGS. 4 to 12. In other words, in FIG. 16, the connection between the image p10 and p11 by the node n1 means that the time interval between the shot times of the image p10 and p11 is the smallest.

In other words, in step S31, the grouping processing section 92 determines, from the viewpoint from the node nil in FIG. 16, whether the number of images connected by the node nil is higher than a predetermined number of images. Here, the number of images from the viewpoint of the node n11 is twelve of the images p1 to p12. Therefore, if the selected number of images is four, it is determined that the number of images connected by the node nil is higher than the selected number of images. Then, the processing moves to step S32.

On the other hand, if it is determined in step S31 that the number of images contained in the node is equal to or lower than the predetermined number of images, the processing ends.

The predetermined number of images here is the upper limit value of the number of images to be laid out on each page of the scrapbook to be created and is set in accordance with the maximum number of images to be laid out on each page of a recorded layout template or the total number of the recorded layout templates.

In step S32, the grouping processing section 92 divides a binary tree. For example, the grouping processing section 92 divides the binary tree connected by the node nil in FIG. 16 into binary trees with the node n9 at the top and with the node n10 at the top as indicated by the broken lines in FIG. 17.

In step S33, the grouping processing section 92 determines, from the viewpoint of the tops of the divided binary trees, whether the numbers of images connected by the nodes are higher than a predetermined number of images or not.

In other words, in step S33, the grouping processing section 92 determines, from the viewpoint of the node n10, whether the number of images connected by the node n10 is higher than four or not. Since the number of images from the viewpoint of the node n10 is the seven images p1 to p7, the number is determined as being higher than four, which is the predetermined number of images. Thus, the processing returns to step S32.

In step S33, the grouping processing section 92 further determines, from the viewpoint of the node n9, whether the number of images connected by the node n9 is higher than four or not. Since the number of images from the viewpoint of the node n9 is the five images p8 to p12, the number is determined as being higher than four, which is the predetermined number of images. Thus, the processing returns to step S32.

In this way, the processing in step S33 is performed on each of the divided binary trees.

In the second step S32, the grouping processing section 92 divides the binary tree. For example, the grouping processing section 92 divides the binary tree connected by the node n9 in FIG. 17 into binary trees with the node n6 at the top and with the node n8 at the top as indicated by the broken lines in FIG. 18. The grouping processing section 92 further divides the binary tree connected by the node n10 in FIG. 17 into the image p8 and a binary tree with the node n7 at the top as indicated by the broken lines in FIG. 18.

In the second step S33, the grouping processing section 92 determines, from the viewpoint of the node n6, whether the number of images connected by the node n6 is higher than four or not. Since the number of images from the viewpoint of the node n6 is the three images p1 to p3, the number is determined as not being higher than four, which is the predetermined number of images. Then, the processing ends. The grouping processing section 92 further determines, from the viewpoint of the node n8, whether the number of images connected by the node n8 is higher than four or not. Since the number of images from the viewpoint of the node n8 is the four images p4 to p7, the number is determined as not being higher than four, which is the predetermined number of images. Then, the processing ends. Since it is difficult for the grouping processing section 92 to divide the image p8 and the number is not higher than the predetermined number, four, the processing ends. The grouping processing section 92 further determines, from the viewpoint of the node n7, whether the number of images connected by the node n7 is higher than four or not. Since the number of images from the viewpoint of the node n7 is the four images p9 to p12, the number is determined as not being higher than four, which is the predetermined number of images. Then, the processing ends.

In this way, the grouping processing section 92 divides the binary tree structure containing the images p1 to p12 into the group of the images p1 to p3, the group of the images p4 to p7, the group of the image p8 only and the group of the images p9 to p12. The grouped images are laid out in groups on pages of the scrapbook.

Referring back to the flowchart in FIG. 13, the template setting section 72 in step S17 loads the layout template for each page in accordance with the number of images contained in the divided groups. For example, the template setting section 72 loads the layout template for laying out the three images p1 to p3, the layout template for laying out the four images p4 to p7, the layout template for laying out the one image p8, and the layout template for laying out the four images p9 to p12.

In step S18, the template setting section 72 sets the loaded layout template for each page to each page.

In step S19, the contents creating section 55 lays out multiple images in groups, and the scrapbook having the background templates and layout templates set is supplied to and recorded in the contents DB 33 of the recording/reproducing section 18 through the recording/reproducing control section 52. Then, the processing ends.

Figure 19:
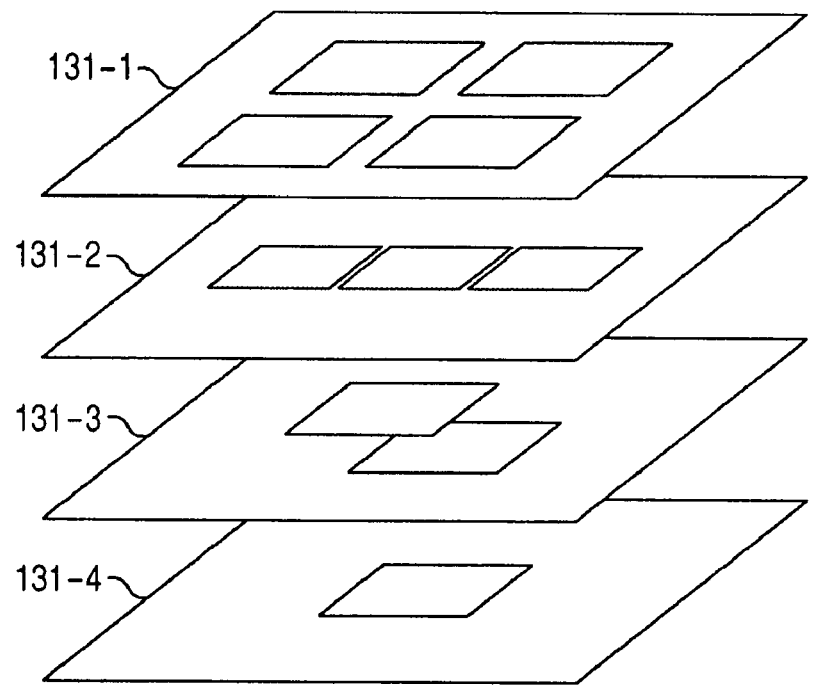
FIG. 19 is a diagram showing examples of layout templates.

FIG. 19 is a diagram showing an example of the construction of the layout template. The layout template determines the number of images to be laid out on each page of a scrapbook. As shown in FIG. 19, layout templates 131-1, 131-2, 131-3 and 131-4 are for laying out four images, three images, two images and one image, respectively. The template setting section 73 sets the layout template corresponding to the number of images in the group of grouped images.

Figure 20:
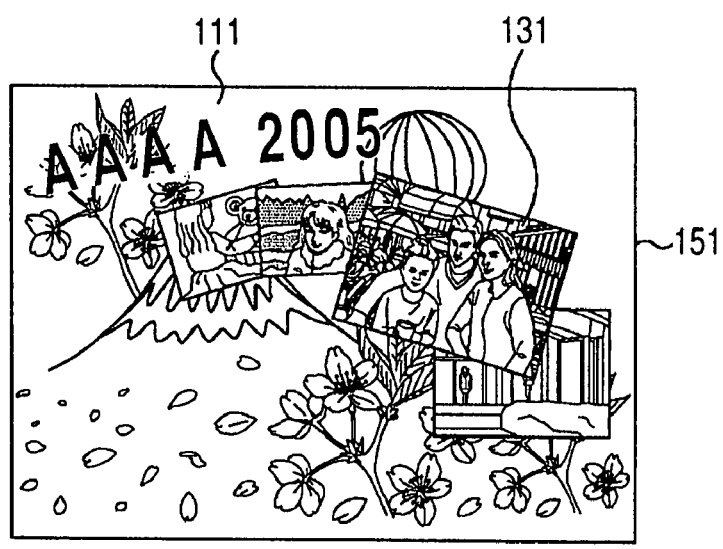
FIG. 20 is a diagram showing an example of the construction of a page of a scrapbook.

FIG. 20 is a diagram showing an example of the construction of a page of the created scrapbook.

In the example in FIG. 20, a background template 111 and a layout template 131 are set to a page 151. The background template 111 may have the same metadata as the metadata of the four images laid on the page 151. The layout of the four images may depend on the layout template 131. The comment, "AAAA 2005", is displayed on the page 151. A user can set an arbitrary comment at an arbitrary position on the page 151 by operating the operating section 19.

Figure 21:
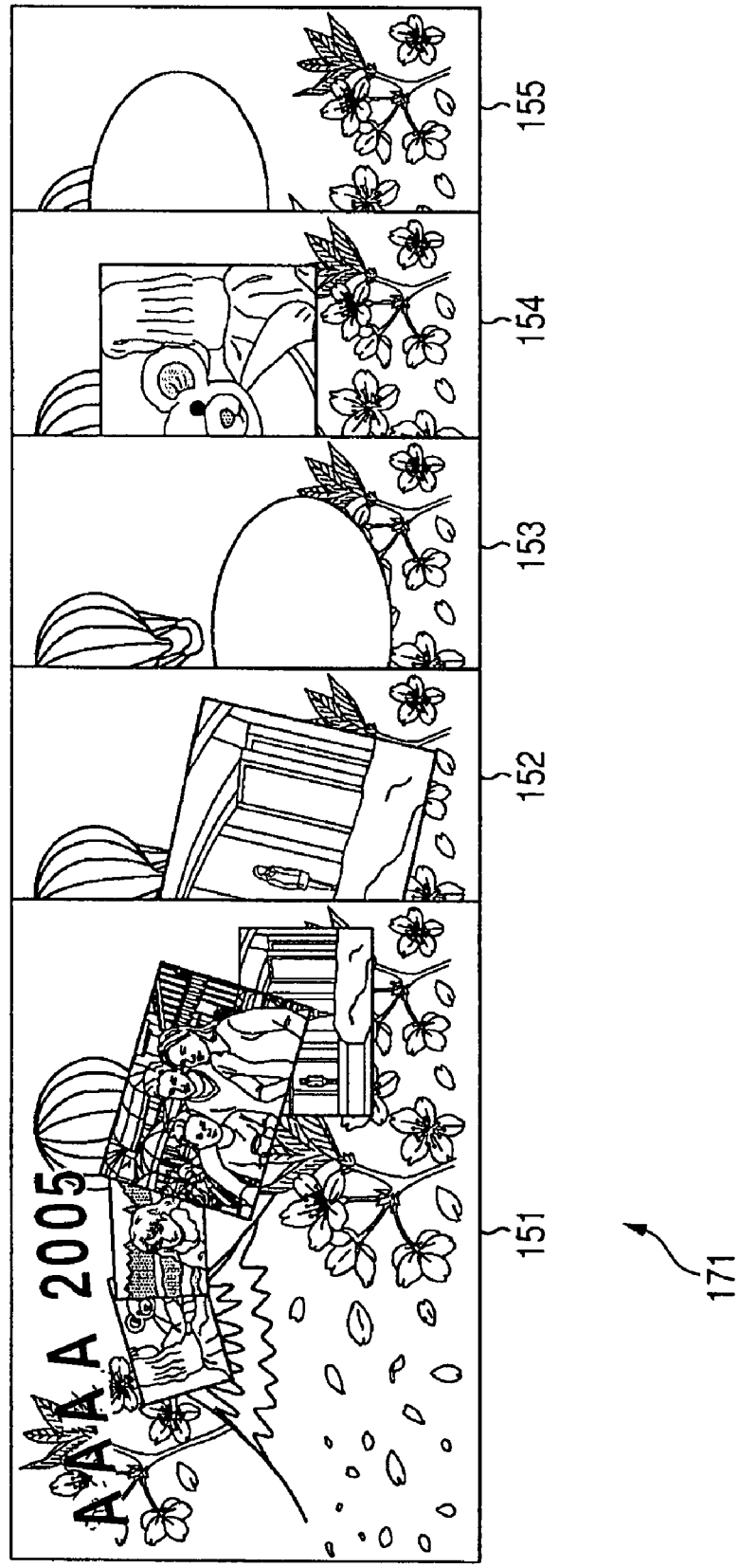
FIG. 21 is a diagram showing an example of the construction of a scrapbook.

FIG. 21 is a diagram showing an example of the construction of the created scrapbook.

In the example in FIG. 21, a scrapbook 171 includes five pages 151 to 155. All images laid out on the pages 151 to 155 of the scrapbook 171 have metadata describing one same event. The background template 111 corresponding to the metadata is set to the scrapbook 171. The page 151 is the front page of the scrapbook 171. The images of the number determined by the layout templates 131-1 to 131-4 are laid out on the pages 152 to 155, like the page 151.

In this way, the HDD recorder 1 can create a scrapbook in which multiple images sorted in meaningful groups are laid out.

Note that the scrapbook may be a new image data combination created from image data or may be edited data that is data for specifying the position for displaying images with reference to image data.

Having described that the clustering section 91 more strongly connects images shot at shot times at a smaller time interval based on the metadata describing the shot times of the images, the clustering section 91 may more strongly connect images shot at shot places apart by a shorter physical distance based on the metadata describing the shot places of the images. Alternatively, the clustering section 91 may more strongly connect images having keywords, which relate to the images, with a higher degree of similarity based on the metadata describing the keyword relating to the images.

Furthermore, a scrapbook may be linked with other multiple scrapbooks. More specifically, for example, scrapbooks may be linked with each other by associating predetermined metadata added to images laid out in the scrapbooks. Furthermore, for example, scrapbooks in which a same image is laid out may be linked.

When the numbers of images laid out on pages of a created scrapbook are unbalanced, the number of images on each page may be corrected. For example, when a page on which one image is laid out and a page on which six images are laid out are continuous in a created scrapbook though the shot times are close to some extent in one same event, the number of images laid out on each of the pages may be corrected such that the numbers of the images laid out on the pages can be three and four. In other words, in the grouping processing as described above, the number of images may be corrected to balance the numbers of images to be laid out on pages.

Figure 22:
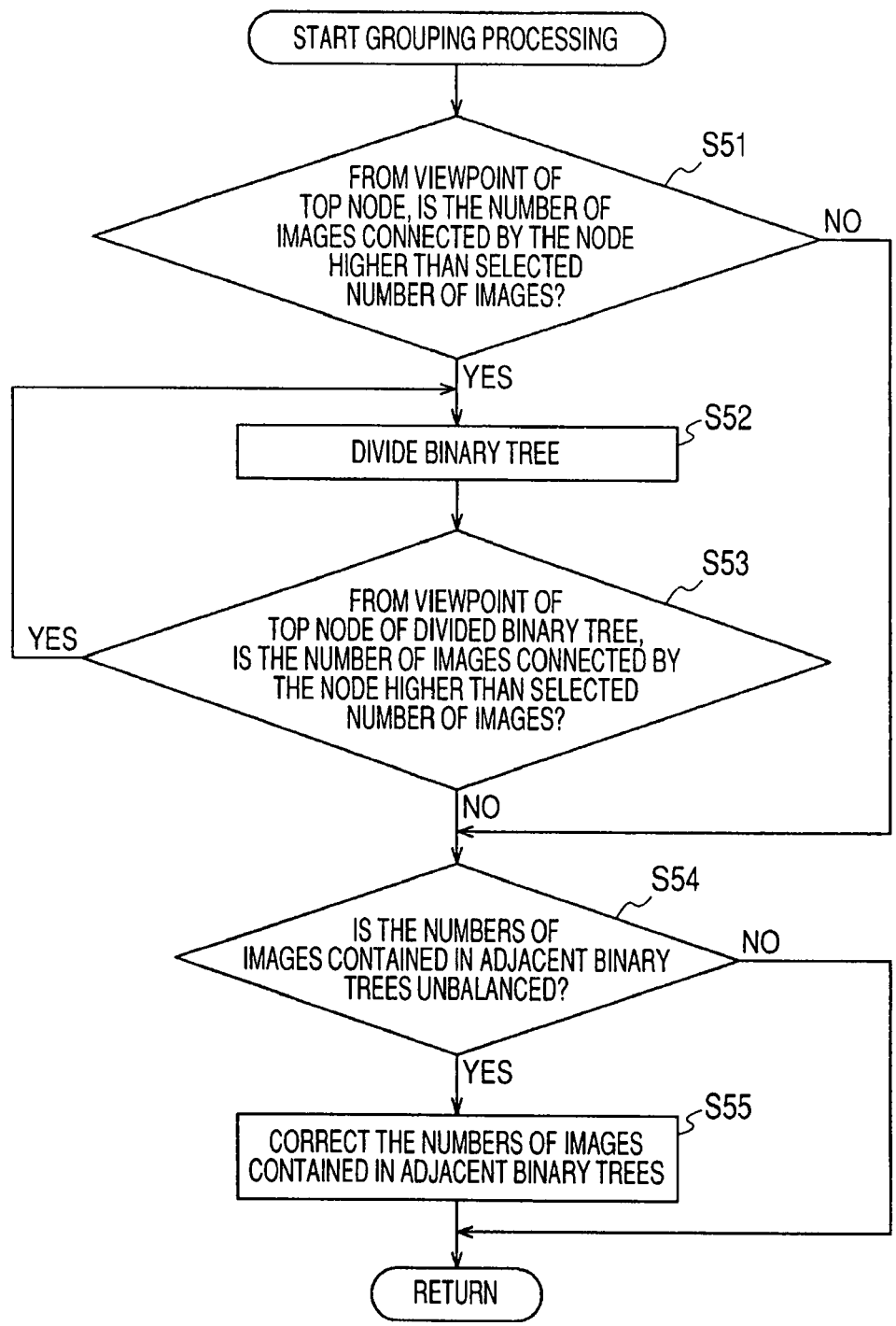
FIG. 22 is a flowchart describing grouping processing including processing of correcting the numbers of images contained in adjacent binary trees.

FIG. 22 is a flowchart describing details of the grouping processing including the processing of correcting the numbers of images contained in adjacent binary trees, which corresponds to the step S16 in the flowchart in FIG. 13.

Since the processing in steps S51 to S53 in the flowchart in FIG. 22 is the same as the processing in steps S31 to S33 in the flowchart in FIG. 15, the description will be omitted herein.

In step S54, the correcting section 93 determines whether the numbers of images, which are images shot in a predetermined time range, contained in adjacent binary trees of the divided binary trees are unbalanced or not. More specifically, for example, the correcting section 93 may determine whether the difference between the numbers of images, which are images in one cluster, that is, images shot in predetermined ten minutes in a predetermined event and are contained in adjacent two binary trees is equal to or higher than a predetermined threshold value or not. Here, the predetermined threshold value is the value determined by a user and is three, here, for example. If it is determined that the number of images contained in the adjacent nodes is three or higher, the processing moves to step S55.

Figure 18:
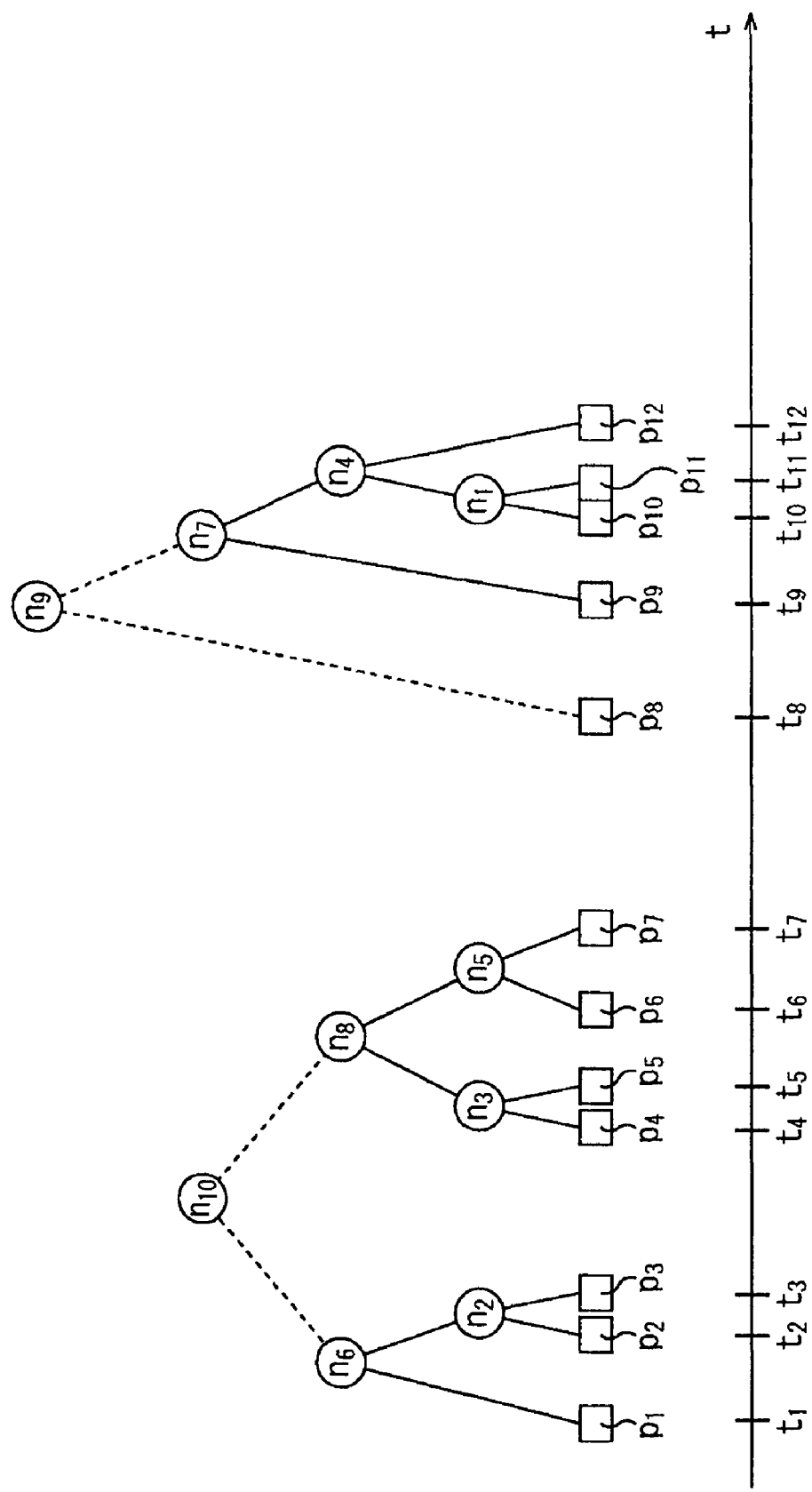
FIG. 18 is a diagram subsequent to FIG. 17, which illustrates the division in a binary tree structure.

For example, when the time interval between the shot time t8 of the image p8 and the shot time t12 of the image p12 is 10 minutes or shorter in FIG. 18, the difference between the one image p8 and the four images p9 to p12 contained in the node n7 is three, which is equal to the threshold value, three. Therefore, the processing moves to step S55.

In step S55, the correcting section 93 corrects the numbers of images contained in the adjacent binary trees, and the processing ends.

Figure 23:
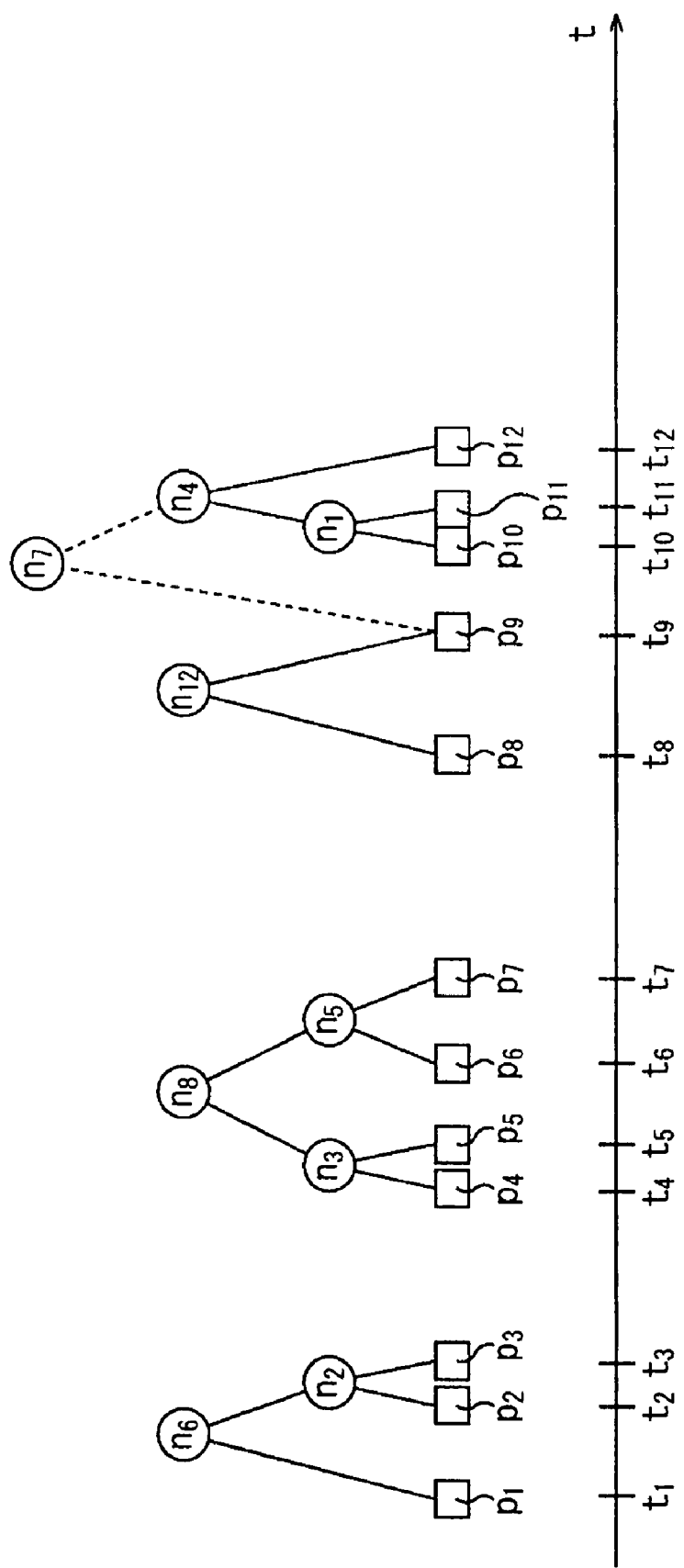
FIG. 23 is a diagram illustrating the correction of the numbers of images contained in adjacent binary trees.

More specifically, in step S55, the correcting section 93 may divide the image p9 connected by the node n7 and the binary tree having the node n4 at the top, as shown in FIG. 23. The correcting section 93 connects, by the node n12, the divided image p8 and the image p9 with a smaller time interval from the image p8 between the image p9 and the binary tree having the node n4 at the top, and the processing ends. Thus, the binary tree containing the two images p8 and p9 and the binary tree containing three images p10 to p12 are created. In this case, the difference between the numbers of images contained in the adjacent binary trees is one.

On the other hand, if it is determined in step S54 that the difference between the numbers of images contained in the adjacent binary trees is not three or higher, the processing ends.

In this way, the HDD recorder 1 can correct the number of images on each page when the numbers of images laid out on pages of a created scrapbook are unbalanced.

Thus, images sorted to meaningful groups are laid out on pages of a scrapbook in consideration of the balance in numbers of images to be laid out on the pages.

Next, the processing of displaying a scrapbook in the HDD recorder 1 will be described.

The control section 20 in the HDD recorder 1 may start processing when the operating section 19 is operated and the control section 20 obtains the instruction for the scrapbook display processing, for example.

Figure 24:
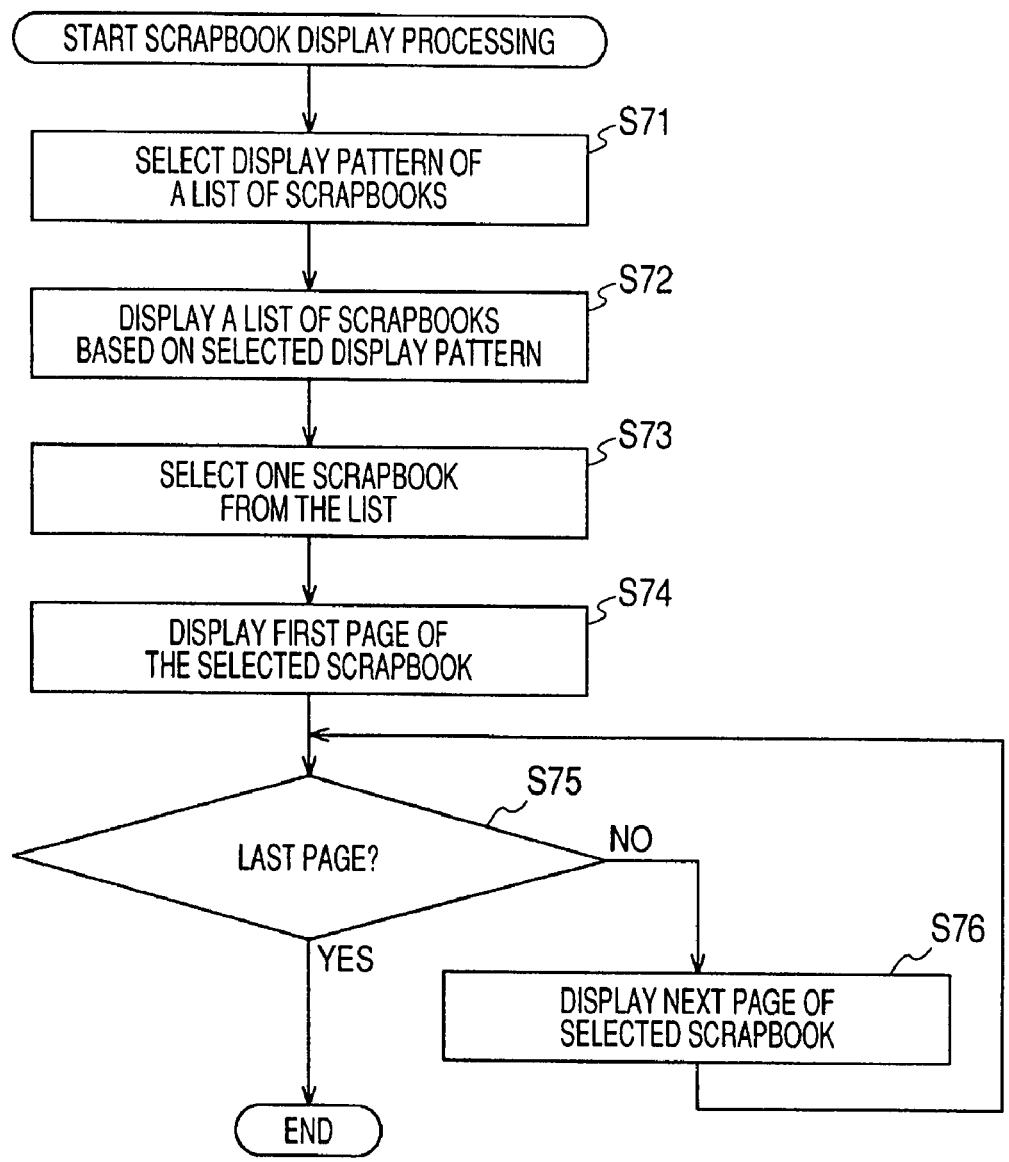
FIG. 24 is a flowchart describing an example of the processing of displaying a scrapbook.

FIG. 24 is a flowchart showing an example of the scrapbook display processing.

In step S71, the selecting section 51 supplies the information describing a display pattern of a list for displaying scrapbooks to be selected by a user to the recording/reproducing control section 52 based on the signal, which is supplied from the operating section 19, indicating an operation by a user for selecting a display pattern of a list for displaying scrapbooks to be displayed on the monitor 2.

In step S72, the recording/reproducing control section 52 loads all recorded scrapbooks from the recording/reproducing section 18. The recording/reproducing control section 52 supplies the display data for displaying a list of the scrapbook to the display control section 53 based on the information describing the list display pattern for displaying the supplied scrapbooks to be selected by a user. The HDD recorder 1 causes the monitor 2 to display a list of the scrapbooks under the control of the control section 20.

In step S73, the selecting section 51 supplies the information indicating one scrapbook from the list of the scrapbooks to be selected by a user to the recording/reproducing control section 52 based on the signal, which is supplied from the operating section 19, indicating the operation by a user for selecting one scrapbook from the list of the scrapbooks displayed on the monitor 2.

Figure 25:
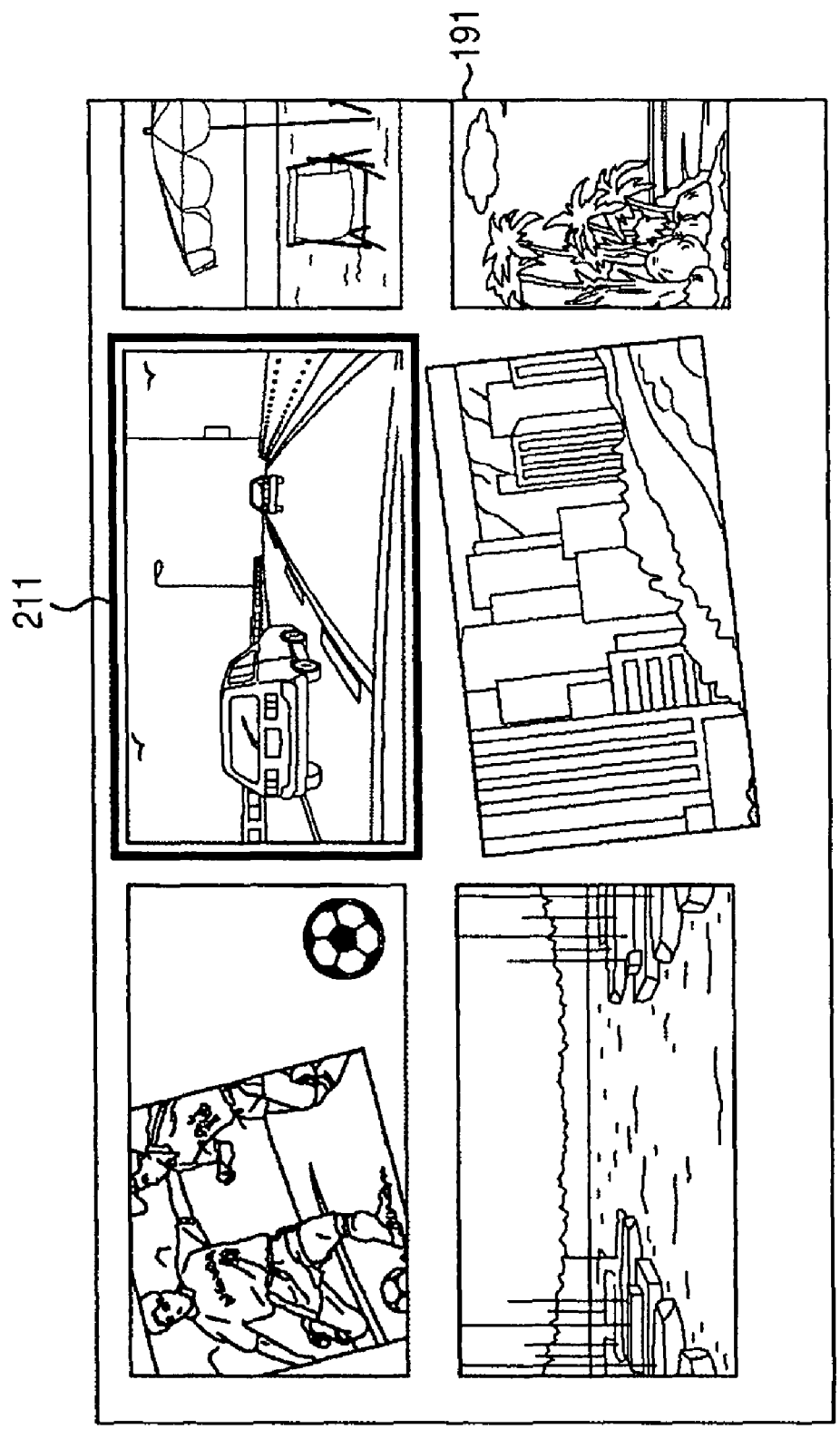
FIG. 25 is a diagram showing an example of the display of a list of scrapbooks.
Figure 26:
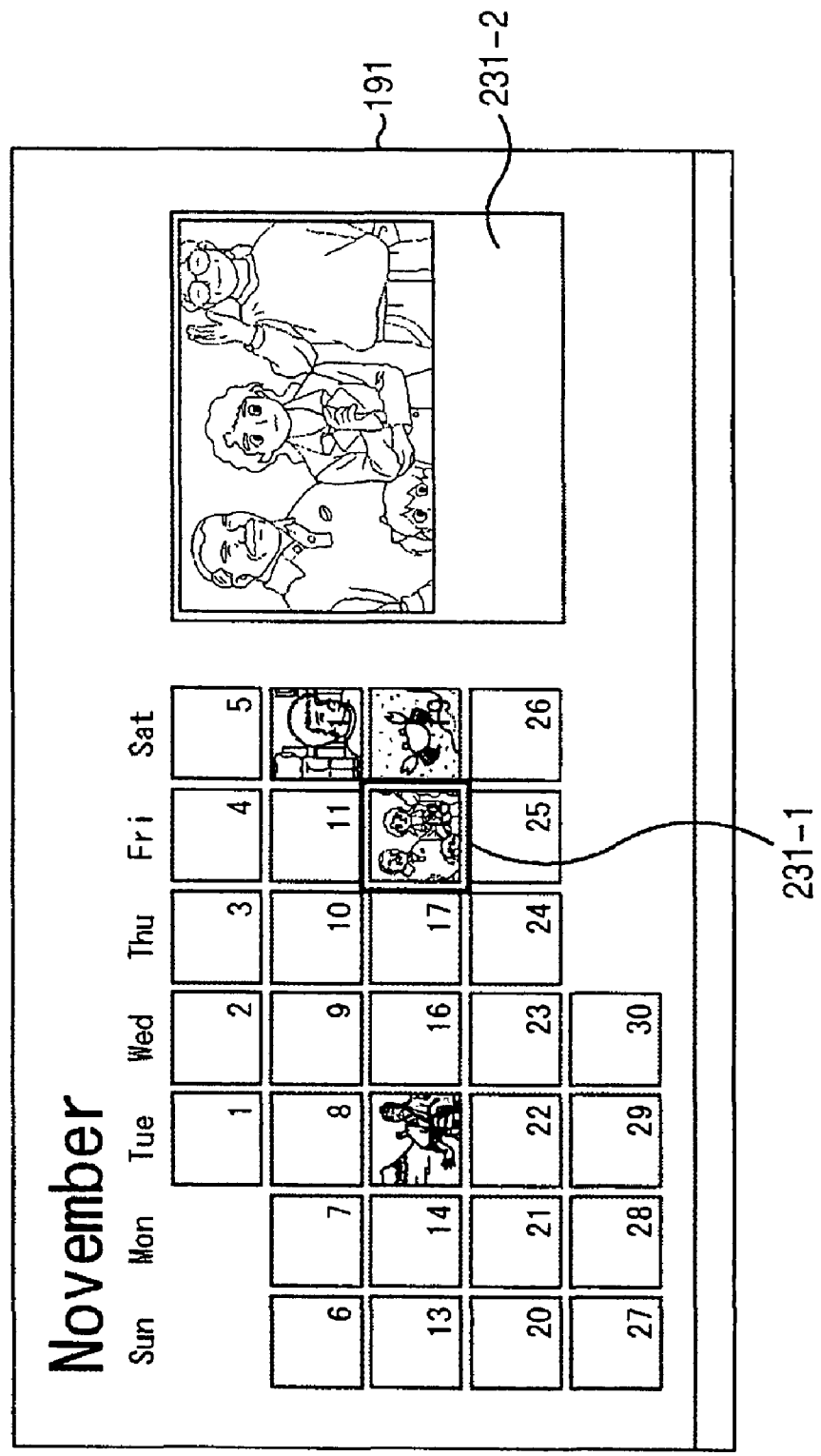
FIG. 26 is a diagram showing another example of the display of a list of scrapbooks.
Figure 27:
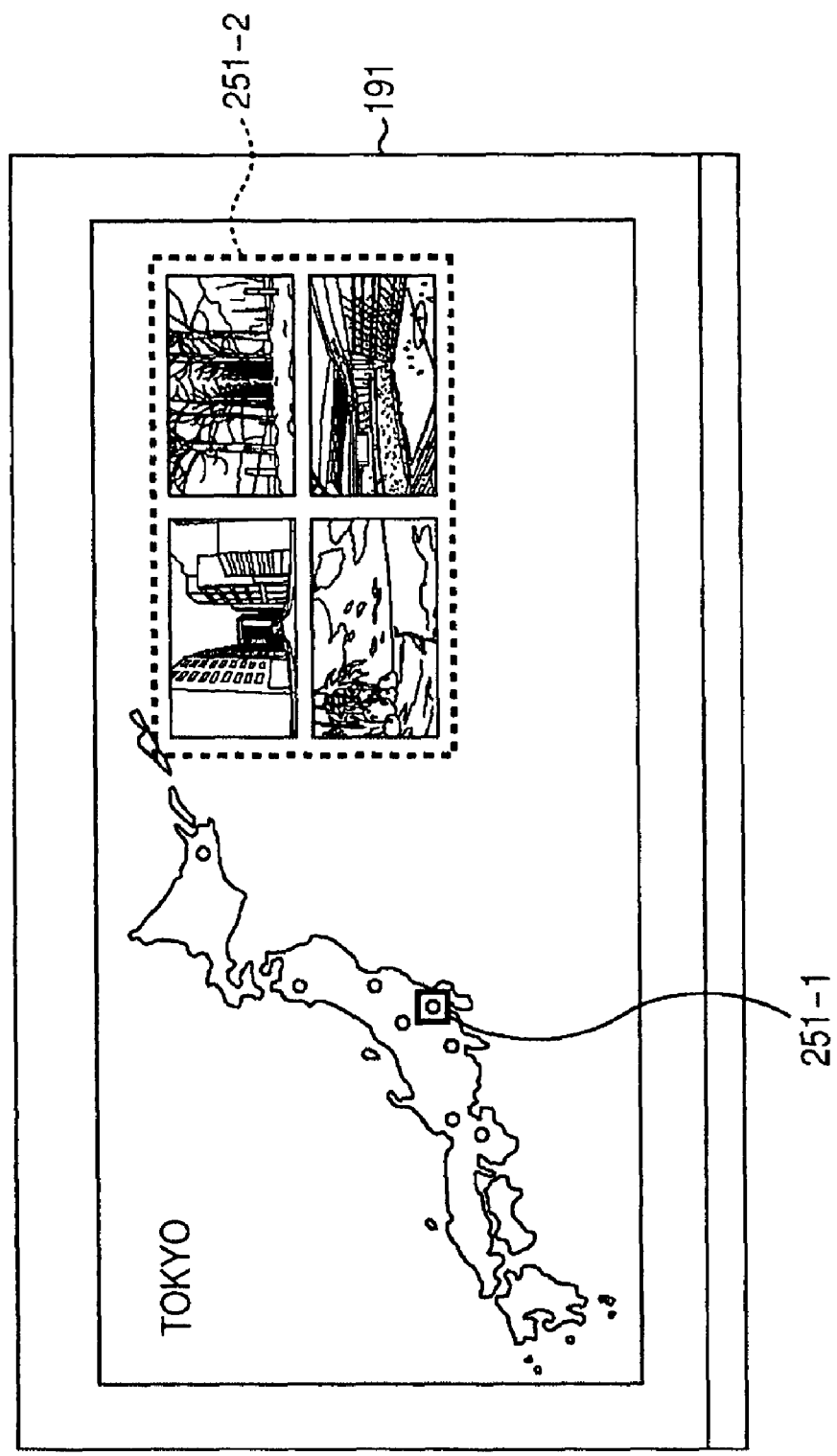
FIG. 27 is a diagram showing another example of the display of a list of scrapbooks.

FIGS. 25 to 27 are diagrams showing examples of the list of scrapbooks to be displayed on the monitor 2.

FIG. 25 is a diagram showing an example of the list of scrapbooks to be displayed in an index form. In the example in FIG. 25, a list of the first pages, which are the front pages, of scrapbooks is displayed on a screen 191 of the monitor 2. A user can select one scrapbook by operating the operating section 19 to move a cursor 211.

FIG. 26 is a diagram showing an example of the list of scrapbooks to be displayed by using a calendar. The screen 191 of the monitor 2 includes a calendar display area to be displayed on the left side and a preview screen display area to be displayed on the right side. The calendar display area displays the first page, which is the front page, of each scrapbook at the space of the corresponding data on the calendar based on the metadata indicating the date added to the scrapbook, for example. The preview screen display area displays a preview screen 231-2 of the scrapbook, which exists at the date selected by a cursor 231-1 on the calendar display area.

In the example in FIG. 26, "November 18" is selected by the cursor 231-1 on the calendar display area showing "November". The preview display area displays the preview screen 231-2 of the scrapbook with the metadata of the selected "November 18".

FIG. 27 is a diagram showing an example of the list of scrapbooks to be displayed by using a map. The screen 191 of the monitor 2 includes a map display area to be displayed on the left side and a list display area to be displayed on the right side. The map display area displays a map showing a predetermined area. A user can select a predetermined place on the displayed map. The list display area may display a list of scrapbooks with the metadata of the place selected by a user, for example.

In the example in FIG. 27, the place "Tokyo" on the map in the map display area is selected by a cursor 251-1. The list display area displays the front pages of the scrapbooks with the metadata "Tokyo". A user can select one scrapbook from the displayed list.

In this way, one scrapbook can be selected from a displayed list of scrapbooks.

Referring back to FIG. 24, the recording/reproducing control section 52 in step S74 supplies display data for displaying a selected scrapbook to the display control section 53 based on the information indicating the scrapbook from a supplied list of the scrapbooks to be selected by a user. Under the control of the control section 20, the HDD recorder 1 causes the monitor 2 to display the first page of the selected scrapbook.

In step S75, on the other hand, the recording/reproducing control section 52 determines whether the displayed page is the last page of the scrapbook or not. If so in step S75, the processing ends.

If not in step S75, the processing moves to step S76.

In step S76, under the control of the control section 20, the HDD recorder 1 causes the monitor 2 to display the next page in the selected scrapbook, and the processing returns to step S75.

In this way, the HDD recorder 1 can cause to display a scrapbook.

Having described that a scrapbook is created from image data, a scrapbook may be created from scrapbooks.

When the creation of contents is controlled in this way, the contents can be created from multiple images. Furthermore, multiple images can be sorted in meaningful groups when clustering is performed on images such that the images at a closer distance can be more strongly connected based on the distance determined by the metadata of the multiple images to be grouped and images are grouped such that the number of images of each of the groups can be equal to or lower than a predetermined number of images in accordance with the strength of the connection among images.

The present invention is not limited to an HDD recorder but is applicable to any apparatus that can record or reproduce an image and/or contents, such as a personal computer.

The series of steps in the processing may be implemented by hardware or software. When the series of steps in the processing is implemented by software, a program included in the software is installed from the removable medium 5 to the control section 20.

The steps describing the program stored in the removable medium 5 herein apparently include processing to be performed chronologically in the described order but not necessarily include processing to be performed chronologically. The steps may include processing to be performed in parallel or separately instead.

According to the embodiments of the invention, contents can be created from multiple images. According to the embodiments of the invention, multiple images can be sorted into meaningful groups.

The embodiments of the invention are not limited to the described embodiments, but various changes may be made to the invention without departing from the scope and spirit of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    clustering means for performing clustering on multiple images so as to more strongly connect the images at a closer distance based on distances determined by metadata of the images;
    grouping means for grouping the images such that a number of images of each group can be equal to or lower than a predetermined number of images in accordance with a strength of connection among the images;
    the metadata describes shot times when the images are shot,
    the distance refers to a time interval between the shot times,
    the clustering means performs clustering on the images by connecting the images in a binary tree structure so as to reduce a number of nodes among the images with smaller time intervals between the shot times based on the shot times when the images are shot, and
    the grouping means groups the images by dividing the binary tree to which the images are connected into subtrees to which a predetermined or smaller number of images are connected; and
    correcting means for correcting the numbers of images contained in adjacent subtrees of the divided subtrees when the numbers of images, which are shot within a predetermined time range and are contained in the adjacent subtrees, are unbalanced.

2. The information processing apparatus according to claim 1, wherein;
    the metadata describes shot places where the images are shot; and
    the distance refers to a physical distance between the shot places.

3. The information processing apparatus according to claim 1, wherein:
    the metadata describes a keyword relating to each of the images; and
    the distance refers to a degree of similarity between the keywords.

4. The information processing apparatus according to claim 1, further comprising:
    creating means for creating contents in which grouped images are laid out in groups.

5. The information processing apparatus according to claim 4, wherein the creating means defines the layout of the images in the contents to display the contents based on the number of the grouped images.

6. The information processing apparatus according to claim 5, further comprising:
    display control means for controlling display of contents.

* * * * *